United States Patent
Devine et al.

(10) Patent No.: US 8,868,880 B2
(45) Date of Patent: Oct. 21, 2014

(54) VIRTUALIZATION WITH MULTIPLE SHADOW PAGE TABLES

(71) Applicant: VMware, Inc., Palo Alto, CA (US)

(72) Inventors: Scott W. Devine, Katonah, NY (US); Lawrence S. Rogel, Brookline, MA (US); Prashanth P. Bungale, Natick, MA (US); Gerald A. Fry, Brighton, MA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/913,131

(22) Filed: Jun. 7, 2013

(65) Prior Publication Data

US 2013/0283004 A1    Oct. 24, 2013

Related U.S. Application Data

(63) Continuation of application No. 13/289,170, filed on Nov. 4, 2011, now Pat. No. 8,464,022, which is a continuation of application No. 12/466,293, filed on May 14, 2009, now Pat. No. 8,074,045.

(60) Provisional application No. 61/057,727, filed on May 30, 2008.

(51) Int. Cl.
| | |
|---|---|
| *G06F 12/10* | (2006.01) |
| *G06F 12/08* | (2006.01) |
| *G06F 12/00* | (2006.01) |
| *G06F 12/02* | (2006.01) |
| *G06F 9/455* | (2006.01) |
| *G06F 12/06* | (2006.01) |

(52) U.S. Cl.
CPC ............ *G06F 12/1009* (2013.01); *G06F 9/455* (2013.01); *G06F 12/06* (2013.01); *G06F 2212/152* (2013.01); *G06F 2212/151* (2013.01); *G06F 12/10* (2013.01); *G06F 12/08* (2013.01); *G06F 12/0246* (2013.01); *G06F 12/109* (2013.01)
USPC ......................... 711/202; 711/6; 711/E12.016

(58) Field of Classification Search
CPC ... G06F 12/08; G06F 12/10; G06F 2212/151; G06F 9/455; G06F 12/109; G06F 2212/152
USPC ........................................ 711/6, 202, E12.016
See application file for complete search history.

(56) References Cited

U.S. PATENT DOCUMENTS

| | | |
|---|---|---|
| 2,722,222 A | 11/1955 | Whaley |
| 6,701,412 B1 | 3/2004 | McDougall et al. |
| 6,725,335 B2 | 4/2004 | Bala et al. |
| 6,889,167 B2 | 5/2005 | Curry, III |
| 7,219,347 B1 | 5/2007 | Waddington |

(Continued)

OTHER PUBLICATIONS

Uhlig, Rich et al., "Intel Virtualization Technology," Computer, published by IEEE Computer Society, vol. 38, No. 5, pp. 48-56, May 2005.

(Continued)

*Primary Examiner* — Ly D Pham

(57) ABSTRACT

A computing system includes virtualization software including a guest operating system (OS). A method maintains, by the virtualization software layer, a first shadow page table for use in a kernel mode and a second shadow page table for use in a user mode. The virtualization software switches between using the first shadow page table and the second shadow page table when the guest OS switches between operating in the kernel mode and the user mode.

20 Claims, 11 Drawing Sheets

(56) References Cited

U.S. PATENT DOCUMENTS

| | | |
|---|---|---|
| 7,313,669 B2 | 12/2007 | Neiger et al. |
| 7,363,463 B2 | 4/2008 | Sheu et al. |
| 7,552,426 B2 | 6/2009 | Traut |
| 7,783,838 B1 | 8/2010 | Agesen et al. |
| 7,788,464 B2 | 8/2010 | Sheu et al. |
| 8,015,388 B1 | 9/2011 | Rihan et al. |
| 8,074,045 B2 | 12/2011 | Devine et al. |
| 8,166,492 B2 | 4/2012 | Fathalla |
| 8,464,022 B2 | 6/2013 | Devine et al. |
| 8,645,951 B2 | 2/2014 | Wang et al. |
| 2004/0230794 A1 | 11/2004 | England et al. |
| 2006/0036830 A1 | 2/2006 | Dinechin et al. |
| 2006/0070065 A1 | 3/2006 | Zimmer et al. |
| 2006/0117130 A1 | 6/2006 | Tsushima et al. |
| 2006/0130016 A1 | 6/2006 | Wagner |
| 2007/0016755 A1 | 1/2007 | Pratt et al. |
| 2007/0061441 A1 | 3/2007 | Landis et al. |
| 2007/0136506 A1 | 6/2007 | Traut et al. |
| 2008/0168479 A1 | 7/2008 | Purtell et al. |
| 2008/0235477 A1 | 9/2008 | Rawson |
| 2008/0235793 A1 | 9/2008 | Schunter et al. |
| 2009/0300263 A1 | 12/2009 | Devine et al. |
| 2009/0300612 A1 | 12/2009 | Devine et al. |
| 2009/0300645 A1 | 12/2009 | Devine et al. |
| 2010/0031360 A1 | 2/2010 | Seshadri et al. |
| 2010/0088474 A1 | 4/2010 | Agesen |
| 2010/0095045 A1 | 4/2010 | Lambeth et al. |
| 2010/0180276 A1 | 7/2010 | Jiva |
| 2010/0274987 A1 | 10/2010 | Subrahmanyam et al. |
| 2012/0047348 A1 | 2/2012 | Devine et al. |

OTHER PUBLICATIONS

Adams, Keith et al., "A Comparison of Software and Hardware Techniques for x86 Virtualization," ASPLOS'06, 12 pgs., Oct. 21-15, 2006.

Bhardwaj, Rishi et al., "A Choices Hypervisor on the ARM Architecture," University of Illinois, 5 pgs., Apr. 2006.

VIRTUALIZATION WITH MULTIPLE SHADOW PAGE TABLES

CROSS-REFERENCE TO RELATED APPLICATIONS

This application is a continuation of U.S. patent application Ser. No. 13/289,170 entitled "Virtualization with Shadow Page Tables" filed on Nov. 4, 2011, issued on Jun. 11, 2013 as U.S. Pat. No. 8,464,022; which is a continuation of U.S. patent application Ser. No. 12/466,293 entitled "Virtualization with Fortuitously Sized Shadow Page Table" filed on May 14, 2009, issued on Dec. 6, 2011 as U.S. Pat. No. 8,074,045; which claims the benefit of benefit of U.S. Provisional Application No. 61/057,727, filed May 30, 2008), all of which are incorporated by reference for all purposes. This application is also related to the following applications which are owned by the assignee of this application, filed on May 14, 2009 and which are entitled: "In-place Shadow Tables for Virtualization" (U.S. patent application Ser. No. 12/466,159); "Virtualization with Merged Guest Page Table and Shadow Page Directory" (U.S. patent application Ser. No. 12/466,258); "Distributing Virtualization Software Address Space in Guest OS Address Space" (U.S. patent application Ser. No. 12/466,325); and "Virtualization with In-place Translation" (U.S. patent application Ser. No. 12/466,343), all of which are incorporated by reference for all purposes.

BACKGROUND

Over the years, a variety of techniques have been used for executing multiple software modules within a computer system. Early computer systems could execute multiple software programs, but they could only execute one program at a time. For example, such computers might load one program into memory and execute it to completion, or other termination, before proceeding to a subsequent program that would then be loaded into memory and executed. As another example, various multi-tasking operating systems (OSs) enable multiple programs (or selected portions thereof) to be loaded into memory at one time, and to be executed in an alternating manner, according to a scheduling algorithm. Also, some processors include multi-threading capabilities which enable multiple threads of one or more programs to be executed simultaneously on a single processor. Finally, multi-processor computer systems have also become commonplace where each of the multiple processors can execute one or more threads, all at the same time.

Such computer systems generally attempt to isolate code and data of different software modules from each other, so that, for example, one software module cannot interfere with the execution of another software module by altering its code or data. Such isolation may be provided for code and/or data that is stored on a hard drive (or other secondary data storage means) and/or that is resident in main memory (or other primary data storage means).

As one example of the isolation of code and data, many computer systems implement a virtual addressing mechanism in which different software modules within the computer system have different virtual address spaces, with each virtual address space being mapped to different portions of physical address space of the computer system. As such, virtual addresses of a given software module are only mapped to physical addresses that contain code or data of that particular software module. Thus, although a given software module may access every memory location in its own virtual address space; it will only be able to access its own code and data (assuming that there is no shared memory). Thus, a virtual addressing mechanism provides some isolation between code and data of multiple software modules in a computer system. Various other mechanisms may also be implemented in such computer systems to isolate the code and/or data of multiple software modules from one another.

FIG. 1 illustrates computer system 2A that has multiple software modules. Computer system 2A includes system hardware (system H/W 100A), an operating system (OS 20A), a first software application (APP 40A) and a second software application (APP 40B). System H/W 100A may be conventional hardware based on, for example, the x86 platform, and OS 20A may be, for example, a Windows OS or a Linux OS. APPs 40A and 40B may be any applications designed to run on system H/W 100A and OS 20A. OS 20A also includes a set of drivers (DRIVERS 29A) which may be conventional drivers for OS 20A, possibly including one or more drivers from a company that is different from the OS vendor.

OS 20A, in conjunction with system H/W 100A, attempts to isolate the code and data of APPs 40A and 40B from one another. For example, OS 20A and system H/W 100A may implement a virtual addressing mechanism, as described above. As illustrated in FIG. 1, implementing such a protection mechanism may be characterized as establishing an isolation barrier (indicated by dotted line) 80B between APPs 40A and 40B, thereby preventing (or at least hindering) one application from accessing the code and data of the other application. There may also be some code and/or data that are shared explicitly or transparently between APPs 40A and 40B. Techniques are known for allowing such sharing of code and data while maintaining isolation between APPs 40A and 40B. OS 20A also establishes an isolation barrier (indicated by dotted line 80A) between OS 20A and all applications in computer system 2A, including APPs 40A and 40B.

Machine virtualization provides certain advantages in establishing OS isolation barriers and application isolation barriers. A virtual machine (VM) is a software abstraction—a "virtualization"—of an actual or an abstract physical computer system. The VM runs as a "guest" on an underlying "host" hardware platform. Guest software, such as a guest OS and guest applications, may be loaded onto the virtual machine for execution. The guest OS may, but need not, be the same as an OS or other system software running at a system level in the host computer system. For example, in one known type of machine virtualization, a Windows OS may be run in a VM even though an OS used to handle I/O (input/output), memory management, etc., on the host computer might be a Linux OS. Also, as long as a suitable interface is provided between a VM and a host hardware platform, a user of a VM might not be aware that s/he is not using a "real" computer, that is, a computer system with hardware dedicated exclusively to her/his use.

FIG. 2 illustrates computer system 2B in which multiple VMs are implemented. Computer system 2B includes system hardware (system H/W 100B) which may be conventional hardware such as hardware based on the x86 platform. System H/W 100B may be substantially the same as system H/W 100A of FIG. 1, or it may be different. Virtualization software 200A executes on system H/W 100B, and supports a plurality of VMs, such as a first VM (VM 300A) and a second VM (VM 300B), in a known manner. Virtualization software 200A may comprise a Virtual Machine Monitor (VMM), for example, a VMM implemented in a virtualization product of VMware, Inc., Palo Alto, Calif. Such a VMM and other components of virtualization software 200A are described in greater detail below.

In supporting VM 300A, virtualization software 200A virtualizes system hardware (VIRTUAL H/W 310A), which VIRTUAL H/W 310A may be based on an existing hardware platform such as the x86 platform. OS 20B, along with a set of drivers 29B, run on VIRTUAL H/W 310A. OS 20B may be any OS designed to run on VIRTUAL H/W 310A. For example, if VIRTUAL H/W 310A is based on the x86 platform, OS 20B may be a Windows OS or a Linux OS. In addition, the set of drivers 29B may be conventional drivers for OS 20B. As further shown in FIG. 2, a first software application (APP 40C) and a second software application (APP 40D) run on OS 20B. APPs 40C and 40D may be any applications designed to run on VIRTUAL H/W 310A and OS 20B. Similar to OS 20A of FIG. 1, OS 20B, in conjunction with VIRTUAL H/W 310A, attempts to isolate the code and data of APPs 40C and 40D from one another, thereby establishing an OS isolation barrier (indicated by dotted line 80B) between APPs 40C and 40D. Also similar to OS 20A of FIG. 1, OS 20B, again in conjunction with VIRTUAL H/W 310A, establishes an OS isolation barrier (indicated by dotted line 80A) between OS 20B and all applications in VM 300A, including APPs 40C and 40D. Thus, VM 300A may operate substantially the same as computer system 2A shown in FIG. 1, except that VIRTUAL H/W 310A is a software abstraction of hardware, created by virtualization software 200A instead of physical hardware.

Virtualization software 200A supports VM 300B, including virtual system hardware (VIRTUAL H/W 310B), OS 20C, drivers 29C, and software applications (APPs 40E and 40F) in a manner similar to that of VM 300A and its corresponding component elements. Similar to OS 20B, OS 20C, in conjunction with VIRTUAL H/W 310B, attempts to isolate the code and data of APPs 40E and 40F from one another, establishing an OS isolation barrier (indicated by dotted line 80B) between APPs 40E and 40F. Also similar to OS 20B, OS 20C, in conjunction with VIRTUAL H/W 310B, establishes an OS isolation barrier (indicated by dotted line 80A) between OS 20C and all applications in VM 300B, including APPs 40E and 40F. Thus, VM 300B may also be substantially similar to computer system 2A, except that VIRTUAL H/W 310B is a software abstraction of hardware, created by virtualization software 200A instead of physical hardware.

Virtualization software 200A isolates VMs 300A and 300B in computer system 2B from one another. For example, virtualization software 200A allows software within VM 300A to access portions of physical memory in system H/W 100B, and allows software within VM 300B to access other portions of the physical memory. Virtualization software 200A maps attempted memory accesses from the respective VMs 300A and 300B to different portions of the physical memory, ensuring that no memory address generated by software in one VM can access code or data of another VM. In a similar manner, virtualization software 200A maps attempted hard disk accesses from the respective VMs 300A and 300B to different portions of one or more hard disks in system H/W 100B, ensuring that one VM cannot access the hard disk space of another VM.

Virtualization software 200A also takes other precautions to isolate VMs 300A and 300B in computer system 2B from one another, and from virtualization software 200A itself. For example, commonly assigned, U.S. Pat. No. 7,281,102, Agesen et al., "Restricting Memory Access to Protect Data when Sharing a Common Address Space," which is incorporated herein by this reference for all purposes, describes methods that may be used to enable a VMM to occupy a portion of a linear address space of a VM, while preventing the VM from accessing the memory of the VMM.

Various other methods may be used to enable virtualization software to coexist with VMs in a virtual computer system, while protecting or isolating the virtualization software from software within the VMs. Virtualization software 200A may also prevent software within VMs 300A and 300B from directly accessing certain hardware resources to further isolate the VMs from one another and from virtualization software 200A. For example, virtualization software 200A may prevent software within VMs 300A and 300B from directly accessing a Direct Memory Access (DMA) device to prevent the DMA device from accessing either hard disk space or memory of other VMs or of the virtualization software itself. Various other precautions may also be taken, depending on the particular implementation.

Thus, virtualization software 200A, in conjunction with system H/W 100B, may be said to establish a first isolation barrier (indicated by dotted line 280B) between VMs 300A and 300B and a second isolation barrier (indicated by dotted line 280A) between virtualization software 200A and all VMs in computer system 2B, including the VMs 300A and 300B. Isolation barriers 280A and 280B may be referred to as "virtualization barriers" because they are established through virtualization of hardware resources, such as virtualization of system memory.

SUMMARY

A computing system includes virtualization software including a guest operating system (OS). A method maintains, by the virtualization software layer, a first shadow page table for use in a kernel mode and a second shadow page table for use in a user mode. The virtualization software switches between using the first shadow page table and the second shadow page table when the guest OS switches between operating in the kernel mode and the user mode.

DETAILED DESCRIPTION

Figure 3:
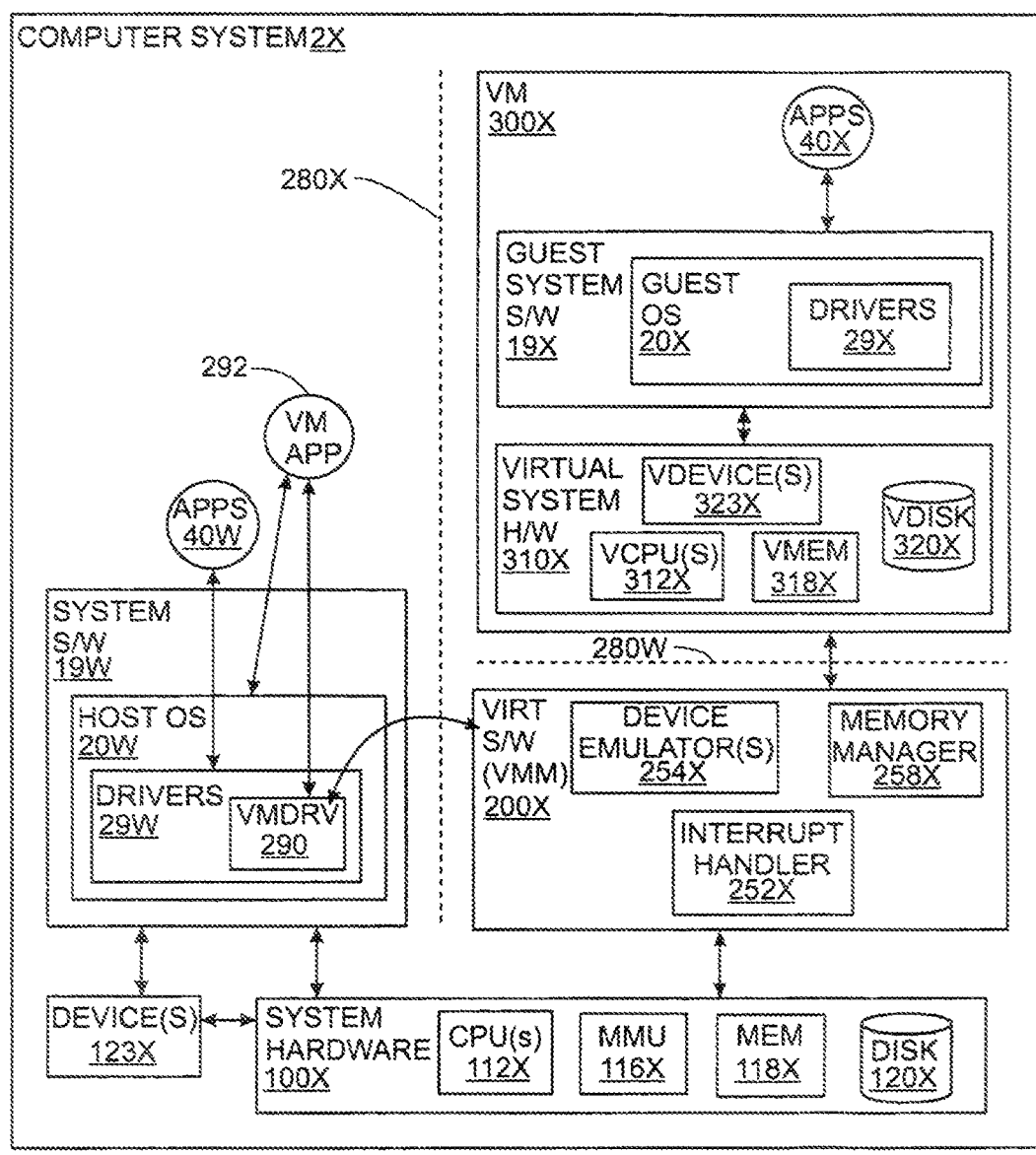
FIG. 3 illustrates a virtual computer system installed on a hosted system.

FIG. 3 illustrates the main components of computer system 2X that supports hosted VM 300X. As in conventional (non-virtualized) computer systems, both system hardware 100X and system software 19W (system SW 19W) are included. As shown in FIG. 3, system hardware 100X includes CPU(s) 112X, which may be a single processor, or two or more cooperating processors in a known multi-processor arrangement. As further shown in FIG. 3, system hardware 100X also includes system memory 118X, one or more disks 120X, and some form of memory management unit 116X (MMU 116X). As is well understood in the field of computer engineering, system hardware 100X also includes, or is connected to, conventional registers, interrupt-handling circuitry, clock(s), etc., which, for ease of understanding, are not shown in the figure.

System software 19W either is, or at least includes, an operating system (HOST OS 20W) which has drivers (DRIVERS 29W) as needed for controlling and communicating with various devices (DEVICE(S) 123X), and usually with disk 120X as well. Conventional software applications (APPS 40W), if included, may be installed to run on system hardware 100X via system SW 19W and any drivers needed to enable communication with devices.

Virtual machine 300X (VM 300X)—also known as a "virtual computer"—is a software implementation of a complete computer system. In VM 300X, physical system components of a "real" computer are emulated in software, that is, they are virtualized. Thus, VM 300X will typically include virtualized ("guest") system hardware (virtual system H/W 310X), which in turn includes one or more virtual CPUs (VCPU(S) 312X), virtual system memory (VMEM 318X), one or more virtual disks (VDISK 320X), and one or more virtual devices (VDEVICE(S) 323X), all of which are implemented in software using known techniques to emulate the corresponding components of an actual computer.

VM 300X also includes guest system software (GUEST SYSTEM SW 19X) which may include a guest operating system (GUEST OS 20X), which may, but need not, simply be a copy of a conventional, commodity OS, as well as drivers (DRIVERS 29X) as needed, for example, to control VDEVICE(S) 323X. Note that a disk—virtual or physical—is also a "device," but is usually considered separately. FIG. 3 also illustrates one or more software applications (APPS 40X) installed to run on GUEST OS 20X. Any number of applications may be loaded for running on GUEST OS 20X, the number being limited only by the requirements of VM 300X. Software running in VM 300X, including GUEST OS 20X and APPS 40X, is generally referred to as "guest software." Note that, GUEST SYSTEM SW 19X may be the same as software that would be loaded into a hardware computer.

Some interface is usually required between VM 300X and the underlying "host" hardware (i.e., system hardware 100X) which is responsible for actually executing VM-related instructions, and transferring data to and from the actual, physical memory (i.e., MEM 118X) and other portions of system hardware 100X. One such interface between VM 300X and the underlying host (for example, software or hardware) is often referred to as a Virtual Machine Monitor (VMM), also known as a virtual machine "manager."

A VMM is usually a relatively thin layer of software that runs directly on top of host software, such as SYSTEM SW 19W, or directly on the host hardware, and it virtualizes the resources of the (or some of the) hardware platform. FIG. 3 shows virtualization software (VIRT SW (VMM) 200X) which may be implemented as a VMM running directly on system hardware 100X. VIRT SW 200X is also referred to as VMM 200X herein, although it may alternatively comprise other virtualization software that may not be considered to be, or called, a VMM. VMM 200X will typically include at least one device emulator (DEVICE EMULATOR(S) 254X) which may also form an implementation of VDEVICE(S) 323X. An interface exported to VM 300X is usually such that GUEST OS 20X cannot determine the presence of VMM 200X. VMM 200X also usually tracks, and either forwards (to HOST OS 20W) or itself schedules and handles, all requests by VM 300X for machine resources, as well as various faults and interrupts. FIG. 3 therefore illustrates an interrupt (including fault) handler (INTERRUPT HANDLER 252X) within VMM 200X. VMM 200X also includes a memory manager (MEMORY MANAGER 256X), the general operation of which is described below. The general features of VMMs are well known and are therefore not discussed in further detail here.

FIG. 3 illustrates a single VM merely for ease of understanding. However, in many installations there will be more than one VM installed to run on the common hardware platform; all may have essentially the same general structure, although the individual components need not be identical. Also, in FIG. 3, a single VMM (VMM 200X) is shown acting as an interface for the single VM (VM 300X). It would also be possible to include VMM 200X as part of VM 300X. Although VMM 200X is usually transparent to VM 200X, the VM and VMM may be viewed as a single module that virtualizes a computer system. The VM and VMM are shown as separate software entities in the figures for the sake of ease of understanding. Moreover, it would also be possible to use a single VMM to act as an interface for more than one VM, although it will in many cases be more difficult to switch between different contexts of various VMs (for example, if different VMs use different guest operating systems). As such, it may be simpler to include a separate VMM for each VM.

In the system illustrated in FIG. 3, both HOST OS 20W and VMM 200X are installed at system level, meaning that they both run at the greatest privilege level, and they each can independently modify the state of the hardware. For I/O to at least some devices, however, VMM 200X may issue requests via HOST OS 20W. To make this possible, a special driver (VMDRV 290) is installed as any other driver within HOST OS 20W, and it exposes a standard API to a user-level application (VMAPP 292). When the system is in a VMM context, meaning that VMM 200X is taking exceptions, handling interrupts, etc., and VMM 200X wishes to use existing I/O facilities of HOST OS 20W, VMM 200X calls driver VMDRV 290. In response, VMDRV 290 issues calls to application VMAPP 292, which, in turn, carries out the I/O request by calling an appropriate routine in HOST OS 20W.

Figure 1:
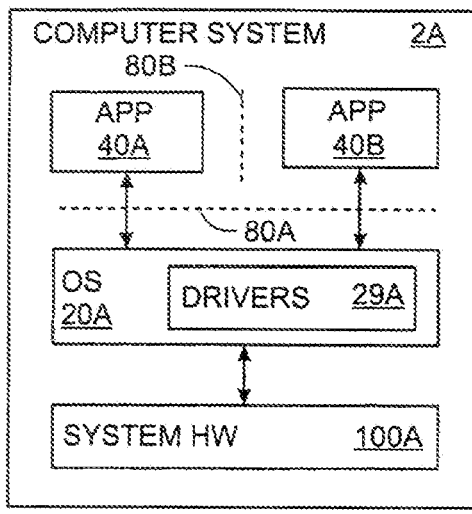
FIG. 1 illustrates a computer system running multiple software modules on a general operating system.
Figure 2:
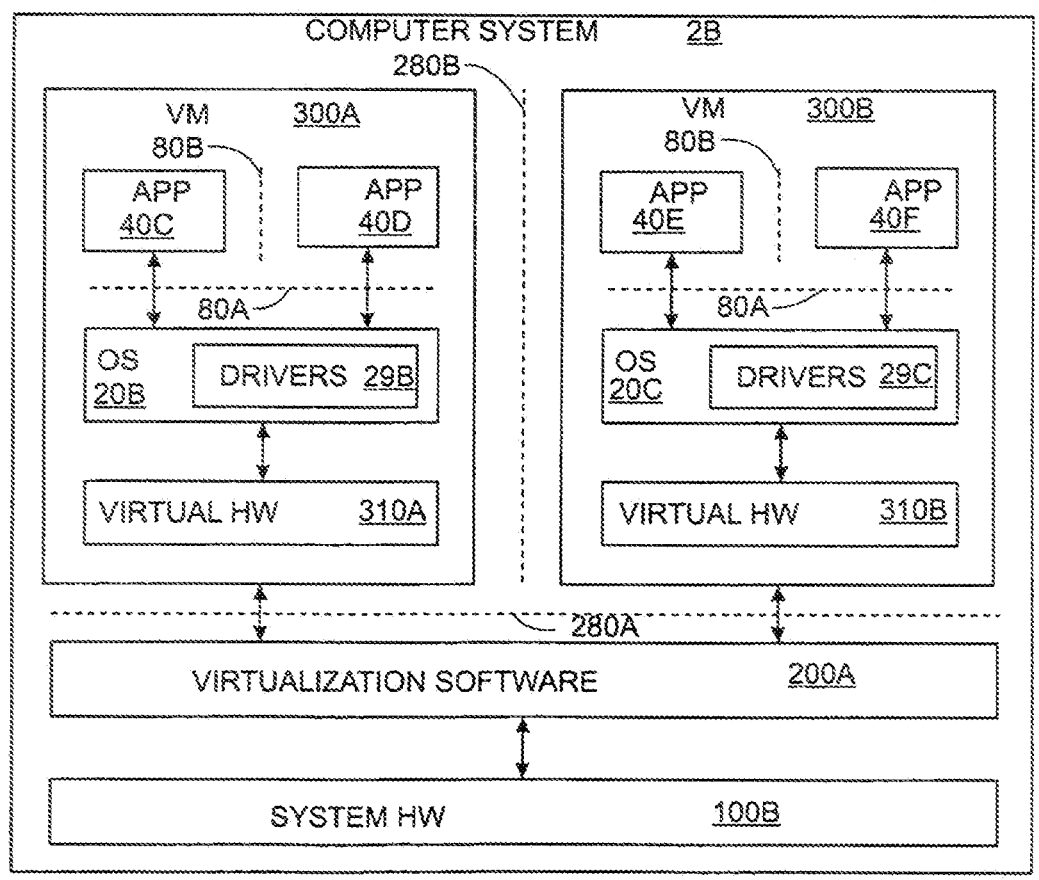
FIG. 2 illustrates a virtual computer system with multiple virtual machines for running multiple software modules.

In FIG. 3, vertical line 280X symbolizes a boundary between virtualized (VM/VMM) and non-virtualized (host software) "worlds" or "contexts." Driver VMDRV 290 and application VMAPP 292 enable communication between the worlds, even though the virtualized world is essentially transparent to host SYSTEM SW 19W. Line 280X may also be characterized as a "virtualization barrier," as that term is used above. However, virtualization barrier 280X does not provide as complete a barrier, or as secure a barrier, between HOST OS 20W and VM 300X as virtualization barrier 280B provides between VM 300A and VM 300B of FIG. 2. This is primarily because SYSTEM SW 19W has direct access to system hardware 100X, including all of memory 118X and disk 120X. In particular, this includes memory and disk space that contains the code and data of VMM 200X and VM 300X. Accordingly, virtualization barrier 280X may be referred to as a "limited virtualization barrier," while virtualization barrier 280B may be referred to more as a "complete virtualization barrier" or as a "bidirectional virtualization barrier." Another virtualization barrier would be established between VM 300X and any other VM in computer system 2X; although no such other virtualization barrier is illustrated in FIG. 3 because only one VM is illustrated. FIG. 3 does show a virtualization barrier (indicated by dotted line 280W) between VM 300X and the VMM 200X. Virtualization barrier 280W may be substantially the same as virtualization barrier 280A of FIG. 2.

In computer system 2X of FIG. 3, VMM 200X is co-resident at system level with HOST OS 20W. Both VMM 200X and host OS 20W can independently modify the state of the host processor, but VMM 200X calls into HOST OS 20W via a driver and a dedicated user-level application to have the host OS perform certain I/O operations on behalf of VM 200X. A virtualized computer in this configuration is fully hosted in that it runs on an existing host hardware platform; together with an existing host OS.

Figure 4:
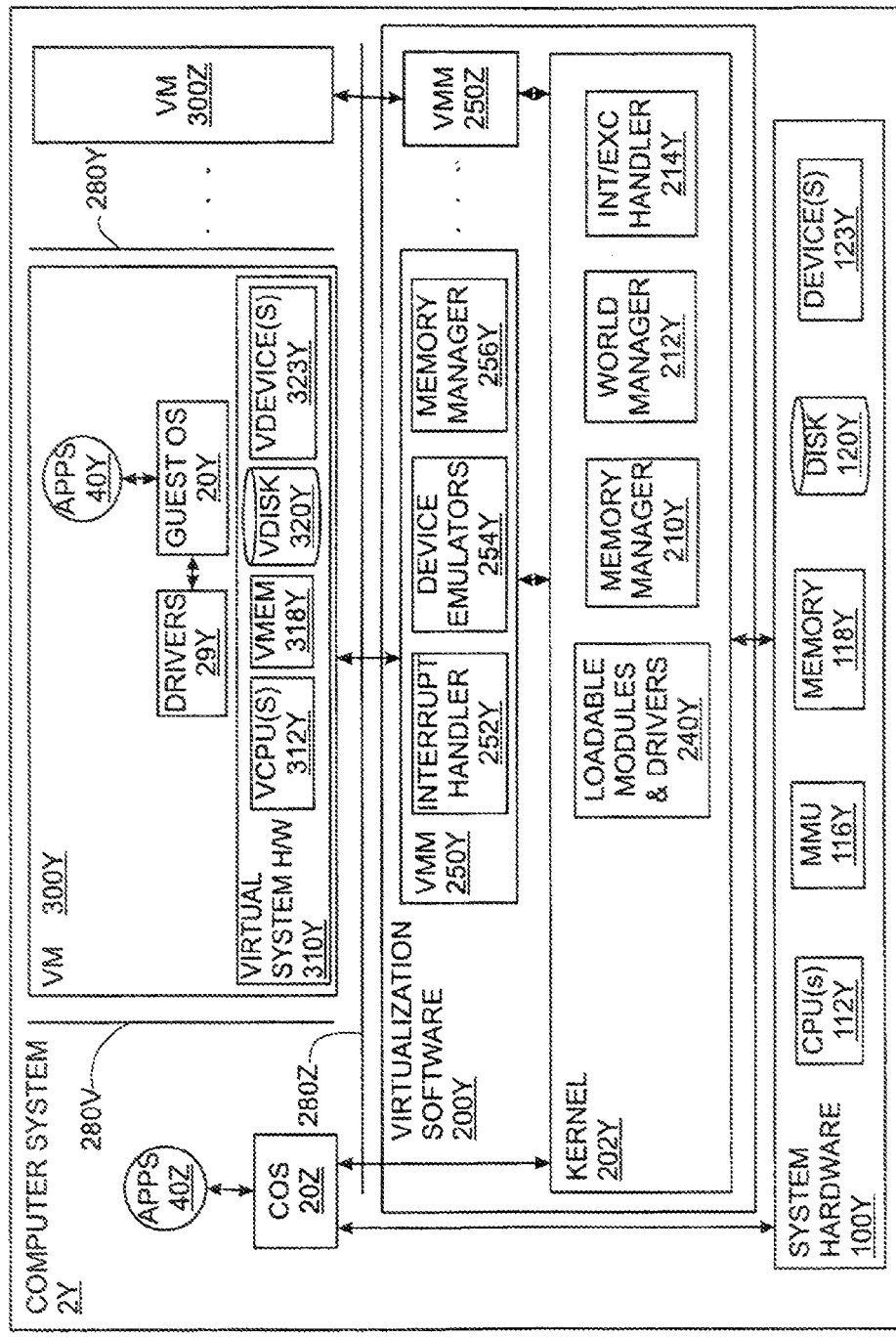
FIG. 4 illustrates a virtual computer system installed on a non-hosted system.

In other implementations of a virtual machine environment, a dedicated kernel takes the place of, and performs the conventional functions of the host OS, and virtual computers run on the kernel. FIG. 4 illustrates the main components of computer system 2Y that supports a plurality of "kernel-based" VMs 300Y-300Z. As shown in FIG. 4, KERNEL 202Y serves as system software for one or more VMM/VM pairs. Compared with a system in which VMMs run on a host OS, use of a kernel offers greater modularity and facilitates provision of services that extend across multiple VMs (for example, for resource management). Compared with the hosted deployment, a kernel may offer greater performance because it can be co-developed with the VMM and can be optimized for the characteristics of a workload consisting of VMMs. The ESX Server virtualization product of VMware, Inc. has such a configuration. A kernel-based virtualization system of the type illustrated in FIG. 4 is described in commonly assigned U.S. Pat. No. 6,961,941, Nelson et al., entitled Computer Configuration for Resource Management in Systems Including a Virtual Machine, which is incorporated herein by this reference for all purposes.

FIG. 4 illustrates the general configuration of kernel-based, virtual computer system 2Y, including one or more VMs, such as a first VM (VM 300Y) and a second VM (VM 300Z), each of which is installed as a "guest" on a "host" hardware platform (SYSTEM HARDWARE 100Y). As FIG. 4 shows, SYSTEM HARDWARE 100Y includes one or more processors (CPU(s) 112Y), system memory (MEMORY 118Y), and one or more disks (DISK 120Y). SYSTEM HARDWARE 100Y may also include other conventional mechanisms such as a memory management unit (MMU 116Y), and various devices (DEVICE(S) 123Y).

As further shown in FIG. 4, VM 300Y includes virtual system hardware (VIRTUAL SYSTEM H/W 310Y) which typically includes at least one virtual CPU (VCPU 312Y), at least one virtual disk (VDISK 320Y), a virtual system memory (VMEM 318Y), and various virtual devices (VDEVICE(S) 323Y). VM 300Y also includes a guest operating system (GYEST OS 20Y) (which may simply be a copy of a conventional operating system) running on VIRTUAL SYSTEM H/W 310Y, along with a set of drivers (DRIVERS 29Y) for accessing VDEVICE(S) 323Y and VDISK 320Y. One or more software applications (APPS 40Y) may execute in VM 300Y on GUEST OS 20Y and VIRTUAL SYSTEM H/W 310Y. All of the components of VM 300Y may be implemented in software using known techniques to emulate the corresponding components of an actual computer. This implementation of VM 300Y may generally be substantially the same as the implementation of VM 300X shown in FIG. 3.

VMs 300Y and 300Z are supported by virtualization software 200Y comprising KERNEL 202Y and a set of VMMs, including a first VMM (VMM 250X) and a second VMM (VMM 250Z). In this implementation, each VMM supports one VM. Thus, VMM 250Y supports VM 300Y, and VMM 250Z supports the VM 300Z. VMM 250Y includes, among other components, device emulators (DEVICE EMULATORS 254Y), which may constitute VDEVICE(S) 323Y that VM 300Y accesses. VMM 250Y may also include a memory manager (MEMORY MANAGER 256Y), the general operation of which is described below. VMM 250Y also usually tracks, and either forwards (to some form of system software) or itself schedules and handles, all requests by VM 300Y for machine resources, as well as various faults and interrupts. A mechanism known in the art as an exception or interrupt handler (INTERRUPT HANDLER 252Y) may therefore be included in VMM 250Y. VMM 250Y will handle some interrupts and exceptions completely on its own. For other interrupts/exceptions, it may be either necessary or at least more efficient for VMM 250Y to call KERNEL 202Y to have KERNEL 202Y either handle the interrupts/exceptions itself, or forward them to some other sub-system such as a console OS (COS 20Z) as described below. VMM 250Y may forward still other interrupts to VM 300Y.

Initially, computer system 2Y may have an existing operating system COS 20Z) that may be at system level, and KERNEL 202Y may not yet even be operational therewithin. An initial system level interface between COS 20Z and system hardware 100Y is shown by a dashed line in FIG. 4. In such case, one of the functions of COS 20Z may be to make it possible to load KERNEL 202Y, after which KERNEL 202Y runs on SYSTEM HARDWARE 100Y, and manages system resources. In effect, KERNEL 202Y, once loaded, displaces COS 20Z. Thus, KERNEL 202Y may be viewed either as displacing COS 20Z from the system level and taking its place itself, or as residing at a "sub-system level." When interposed between COS 20Z and SYSTEM HARDWARE 100Y, KERNEL 202Y essentially turns COS 20Z into an "application" which has access to system resources only when allowed by KERNEL 202Y. KERNEL 202Y then schedules COS 20Z as if it were any other component that needs to use system resources. Accordingly, another interface is shown between COS 20Z and KERNEL 202Y for enabling COS 20Z to access SYSTEM HARDWARE 100Y. This second interface is shown with a solid line in FIG. 4.

COS 20Z may also be included to allow applications unrelated to virtualization to run; for example, a system administrator may need such applications to monitor SYSTEM HARDWARE 100Y or to perform other administrative routines. COS 20Z may thus be viewed as a "console" OS (COS). In such implementations, KERNEL 202Y preferably also includes a remote procedure call (RPC) mechanism to enable communication between, for example, VMM 250Y and any applications (APPS 40Z) installed to run on COS 20Z.

KERNEL 202Y handles the various VMM/VMs and COS 20Z as entities that can be separately scheduled, which are referred to as "worlds." The worlds are controlled by a world manager, represented in FIG. 4 within KERNEL 202Y as WORLD MANAGER 212Y. KERNEL 202Y may include an interrupt/exception handler (INT/EXC HANDLER 214Y)

that is able to intercept and handle interrupts and exceptions for all devices on the machine.

KERNEL 202Y also includes a system memory manager MEMORY MANAGER 210Y) that manages all machine memory that is not allocated exclusively to COS 20Z. When KERNEL 202Y is loaded, information about the maximum amount of memory available on the machine is available to KERNEL 202Y, as well as information about how much of the memory is being used by COS 20Z; part of the machine memory is used for KERNEL 202Y itself, and the rest is used for virtual machine worlds. Virtual machine worlds use machine memory for two purposes. First, memory is used to back portions of a world's memory region, that is, to store code, data, stacks, etc. For example, the code and data VMM 250Y is backed by machine memory allocated by KERNEL 202Y. Second, memory is used for guest memory of the virtual machine. In addition, MEMORY MANAGER 210Y may include algorithms for dynamically allocating memory among the different VMs.

In some embodiments, KERNEL 202Y is responsible for providing access to all devices on the physical machine. In addition to other modules that a designer may choose to load onto the system for access by KERNEL 202Y, KERNEL 202Y will typically load conventional drivers as needed to control access to devices. Accordingly, FIG. 4 shows a module (LOADABLE MODULES & DRIVERS 240Y) containing loadable kernel modules and drivers. KERNEL 202Y may interface with the loadable modules and drivers in a conventional manner; using an API or similar interface.

FIG. 4 also shows a first virtualization barrier (barrier 280V) between COS 20Z and VMs 300X and 300Z, a second virtualization barrier (barrier 280Y) between VMs 300X and 300Z, and a third virtualization barrier (barrier 280Z) between virtualization software 200Y and VMs 300X and 300Z, as well as COS 20Z. There would also be additional virtualization barriers between any other VMs in the computer system. Virtualization barriers 280V and 280Y may be substantially the same as virtualization barrier 280B of FIG. 2, and virtualization barrier 280Z may be substantially the same as virtualization barrier 280A of FIG. 2.

Referring to FIG. 3, when memory addresses are generated in VM 300X, either by APPS 40X or GUEST SYSTEM SW 19X, the addresses are generally mapped to corresponding addresses in physical memory (MEMORY 118X). Both GUEST OS 20X and MEMORY MANAGER 256X are involved in this mapping process. Similarly, when memory addresses are generated in VM 300Y of FIG. 4, either by APPS 40Y or the system software of VM 300Y, GUEST OS 20Y and MEMORY MANAGER 256Y are involved in the process of mapping the addresses to corresponding addresses in physical memory (MEMORY 118Y). These address mapping processes are substantially similar in both hosted virtual computer system 2X of FIG. 3 and kernel-based virtual computer system 2Y of FIG. 4. Thus, the following description is generally limited to the process of mapping addresses from VM 300X of FIG. 3 to physical MEMORY 118X, although it generally also applies to the corresponding process of FIG. 4, and to corresponding processes in other virtual computer systems.

Most modern computers implement a "virtual memory" mechanism, as described briefly above, which allows user-level software to specify memory locations using a set of virtual addresses. These virtual addresses are then translated, or mapped, into a different set of physical addresses that are actually applied to physical memory to access the desired memory locations. The range of possible virtual addresses that may be used by user-level software constitute a virtual address space, while the range of possible physical addresses that may be specified constitute a physical address space. The virtual address space is typically divided into a number of virtual memory pages, each having a different virtual page number, while the physical address space is typically divided into a number of physical memory pages, each having a different physical page number. A memory "page" in either the virtual address space or the physical address space typically comprises a particular number of memory locations, such as either a four kilobyte (KB) memory page or a two megabyte (MB) memory page, as in an x86 computer system.

In a conventional, non-virtualized computer system, system-level software generally specifies mappings from memory pages in the virtual address space using virtual page numbers to memory pages in the physical address space using physical page numbers. The terms "virtual address" and "virtual address space" relate to the well-known concept of a virtual memory system, which should not be confused with computer virtualization technology described elsewhere herein, involving other well-known concepts such as VMMs and VMs. A well-known technique of memory paging may be used to enable an application to use a virtual address space that is larger than the amount of physical memory that is available for use by the application. The code and data corresponding to some of the pages in the virtual address space may reside in physical memory, while other pages of code and data may be stored on a disk drive, for example. If the application attempts to access a memory location in the virtual address space for which the corresponding code and/or data are stored on the disk drive instead of in physical memory, then the system software typically loads a page worth of code and/or data from the disk drive including the desired code and/or data into a page of physical memory (possibly first storing the contents of the memory page to disk). The system software then allows the attempted memory access to complete, accessing the physical memory page into which the code and/or data has just been loaded.

If HOST OS 20W of FIG. 3 implements a virtual memory system, with memory paging and APPS 40W requests access to hardware memory (MEM 118X), for example, the request is issued with a virtual address, which is be mapped to a physical address that is issued to the actual hardware memory. This mapping, or translation, is typically specified by HOST OS 20W, which includes some form of memory management module for this purpose. HOST OS 20W converts the virtual address (VA), in particular, a virtual page number (VPN) of the request, into a "physical" address (PA), in particular, a physical page number (PPN), that can be applied directly to the hardware. The VA and PA typically have a common offset from a base address, so that only the VPN needs to be converted into a corresponding PPN.

When accessing a memory location specified by a virtual address, the virtual address is broken into a virtual page number (higher-order address bits) plus an offset into that page (lower-order address bits). The virtual page number (VPN) is then translated using mappings established by HOST OS 20W into a physical page number (PPN) based on a page table entry (PTE) for that VPN in page tables associated with a currently active address space. The page tables will generally include an entry for every VPN. The actual translation may be accomplished by replacing the VPN with its PPN mapping, leaving the lower order offset bits the same.

To speed up virtual-to-physical address translation, a hardware structure known as a translation look-aside buffer (TLB) is normally included, for example, as part of a hardware memory management unit (MMU 116X). The TLB contains, among other information, VA-to-PA mapping entries, at least, for VPNs that have been addressed recently or frequently. Rather than looking up the page tables in memory, the TLB is searched first instead. Then, if the current VPN is not found in the TLB, a "TLB miss" occurs, and page tables in memory are consulted to find the proper translation. The page is retrieved, the TLB is updated to include the translation. HOST OS 20W specifies the mapping, but hardware MMU 116X actually performs a conversion of one type of page number to the other. Below, for ease of understanding, when it is stated that a software module "maps" page numbers, the existence and operation of a hardware device such as MMU 116X may be assumed.

An extra level of addressing indirection is typically implemented, however, in virtualized systems in that a VPN issued by APPS 40X in VM 300X is remapped twice to determine which page of hardware memory (MEM 118X) is intended. A mapping module within GUEST OS 20X translates the guest VPN (GVPN) into a corresponding guest PPN (GPPN) in the conventional manner. GUEST OS 20X "believes" it is directly addressing the actual hardware memory, but in fact it is not. Of course, a valid address to the actual hardware memory address is needed.

MEMORY MANAGER 256X therefore takes the GPPN issued by GUEST OS 20X, and maps it to a hardware page number PPN that can be used to address the hardware memory (MEM 118X). Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory (MEM 118X). The problem is, though, that "VPN" is then used to mean the virtual page number in both the guest and host contexts, and one should be aware of the current context to avoid confusion. Regardless of notation, however, the intermediate GPPN→PPN mapping performed by VMM 200X is transparent to VM 300X.

Figure 5:
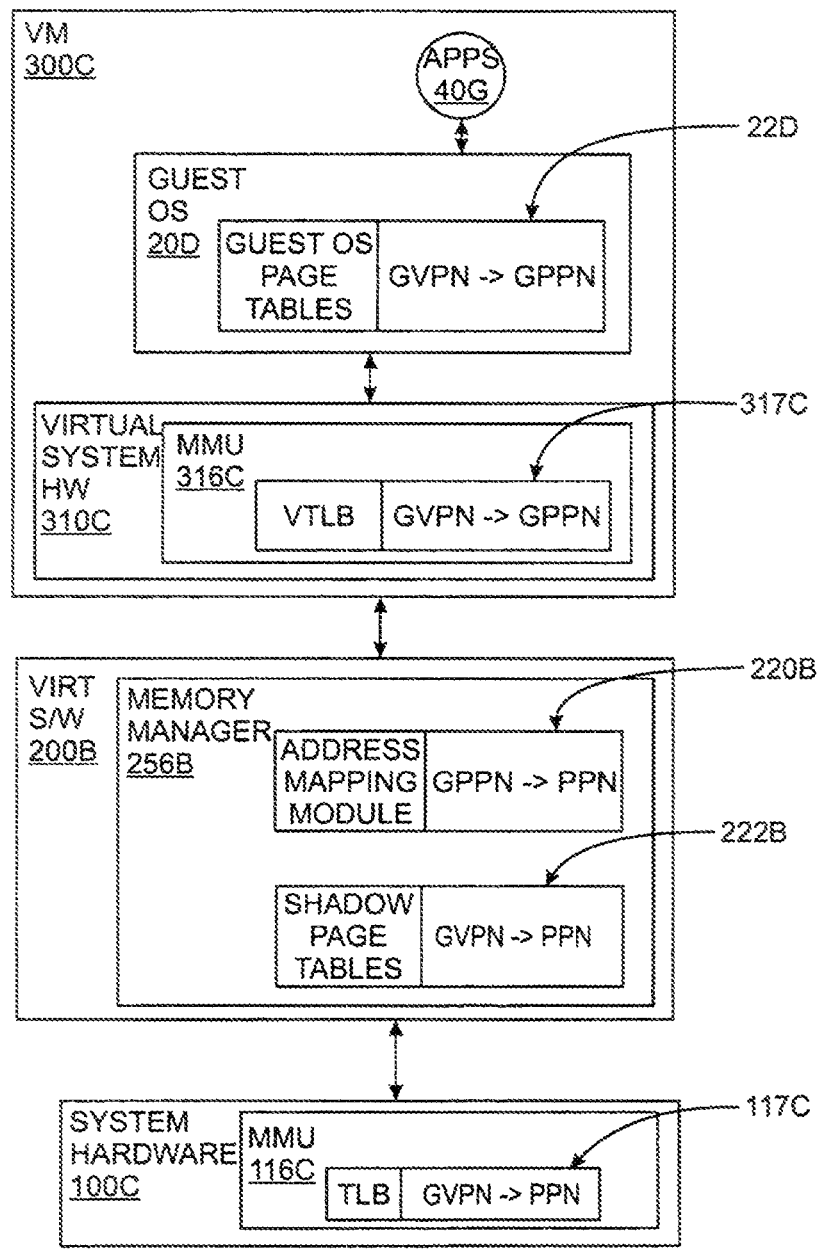
FIG. 5 illustrates address indirection when mapping virtual memory addresses in a virtual computer system including access mode data.

FIG. 5 shows a more abstract virtual computer system that can represent either computer system 2X of FIG. 3 or computer system 2Y of FIG. 4. FIG. 5 illustrates the address mapping process described above, and some of the functional units that are involved in this process. FIG. 5 shows a system hardware (SYSTEM HARDWARE 100C) which includes a memory management unit (MMU 116C), which MMU 116C further includes a translation lookaside buffer (TLB 117C). MMU 116C may be the same as MMU 116X of FIG. 3 or MMU 116Y of FIG. 4.

Virtualization software (VIRT SW 200B) executes on SYSTEM HARDWARE 100C, and may be substantially the same as VIRT SW 200X of FIG. 3 or VIRTUALIZATION SOFTWARE 200Y of FIG. 4. VIRT SW 200B includes a memory manager (MEMORY MANAGER 256B), which further includes an address mapping module (ADDRESS MAPPING MODULE 220B) and a set of shadow page tables (SHADOW PAGE TABLES 222B). MEMORY MANAGER 256B may be substantially the same as MEMORY MANAGER 256X of FIG. 3 or MEMORY MANAGER 256X of FIG. 4.

VIRT SW 200B supports VM 300C which may be substantially the same as VM 300X of FIG. 3 or VM 300Y of FIG. 4. VM 300C includes virtual system hardware (VIRTUAL SYSTEM HW 310C) which further includes MMU 316C, which MMU 316C may further include a virtual TLB (VTLB 317C), although MMU 316C may also be implemented without a virtual TLB. VM 300C also includes a guest OS (GUEST OS 20D) and a set of one or more applications (APPS 40G). GUEST OS 20D includes a set of guest OS page tables (GUEST OS PAGE TABLES 22D).

GUEST OS 20D generates GUEST OS PAGE TABLES 22D that map guest software virtual address space to what GUEST OS 20D perceives to be physical address space. In other words, GUEST OS 20D maps GVPNs to GPPNs. Suppose, for example, that APPS 40G attempts to access a memory location having a first GVPN, and that GUEST OS has specified in GUEST OS PAGE TABLES 22D that the first GVPN is backed by what it believes to be a physical memory page having a first GPPN.

ADDRESS MAPPING MODULE 220B in MEMORY MANAGER 256B keeps track of mappings between the GPPNs of GUEST OS 20D and "real" physical memory pages of physical memory within SYSTEM HARDWARE 100C. Thus, ADDRESS MAPPING MODULE 220B maps GPPNs from GUEST OS 20D to corresponding PPNs in the physical memory. Continuing the above example, ADDRESS MAPPING MODULE 220B translates the first GPPN into a corresponding PPN, let's say a first PPN.

MEMORY MANAGER 256B creates a set of shadow page tables (SHADOW PAGE TABLES 222B) that are used by MMU 116C. SHADOW PAGE TABLES 222B include a number of shadow PTEs that generally correspond to PTEs in GUEST OS PAGE TABLES 22D, but the shadow PTEs map guest software virtual addresses to corresponding physical addresses in the actual physical memory, instead of to the physical addresses specified by GUEST OS 20D. In other words, while GUEST OS PAGE TABLES 22D provide mappings from GVPNs to GPPNs, the shadow PTEs in SHADOW PAGE TABLES 222B provide mappings from GVPNs to corresponding PPNs. Thus, continuing the above example, instead of containing a mapping from the first GVPN to the first GPPN, SHADOW PAGE TABLES 222B would contain a shadow PTE that maps the first GVPN to the first PPN. Thus, when the guest application attempts to access a memory location having the first GVPN, MMU 116C loads the mapping from the first GVPN to the first PPN in SHADOW PAGE TABLES 222B into physical TLB 117C, if the mapping is not already there. This mapping from TLB 117C is then used to access the corresponding memory location in the physical memory page having the first PPN.

For purposes of this specification, certain address mapping phrases are defined as follows: address mappings or translations from guest virtual addresses to guest physical addresses (e.g. mappings from GVPNs to GPPNs) are defined as "guest address mappings" or just "guest mappings," address mappings or translations from guest physical addresses to actual physical addresses (e.g. mappings from GPPNs to PPNs) are defined as "virtualization address mappings" or just "virtualization mappings," and address mappings or translations from guest virtual addresses to actual physical addresses (e.g. from GVPNs to PPNs) are defined as "shadow address mappings" or just "shadow mappings." "Hardware address mappings" or "hardware mappings" are defined more generally as any address mappings or translations that provide mappings to actual physical memory, such that "hardware address mappings" include both "virtualization address mappings" and "shadow address mappings."

Systems and techniques for performing memory tracing to detect accesses to certain areas of the guest physical memory so that a VMM can emulate virtual CPU and devices correctly are described in commonly assigned U.S. Pat. Nos. 6,961,806 and 7,149,843, both entitled System and Method for Detecting Access to Shared Structures, the subject matters of which are incorporated herein by this reference for all purposes. U.S. Pat. Nos. 6,961,806 and 7,149,843, disclose a system and technique for trace protection wherein in the VM's MMU, a VTLB entry contains protection bits specified by the guest OS for the GVPN→GPPN mapping. In the VMM, the memory manager specifies protections bits of the GPPN→PPN mapping. In the shadow page table, the VMM derives the protection bits for a GVPN→PPN mapping by combining the access with the protection bits specified above.

Referring to FIG. 5, VIRT SW 200B creates SHADOW PAGE TABLES 222B for mapping addresses from the guest virtual address space to the physical address space.

One or more embodiments of an in-place shadow page table method described herein reduce memory overhead associated with known shadow page table methods. In accordance with one or more such embodiments, virtualization software, for example, a VMM, directly replaces entries in a guest page table with translated entries which are then traversed by a hardware memory management unit. With these replacements, the guest page table is also a shadow page table. Further, in accordance with one or more such embodiments, a data structure comprised of machine to physical back-mappings is maintained by the virtualization software, for example, the VMM, is used to recreate the original guest page table. Still further, in accordance with one or more such embodiments, any read or write by the guest OS of its own page table may be trapped by the virtualization software, for example, the VMM, and emulated, using the back-mapping data structure, so that the guest is not aware of translations created by the VMM to implement the in-place shadow page tables.

While not being restricted to use in any particular processor architecture, one or more embodiments of the present invention may be used in processor architectures where physical memory may be limited. For example, an ARM architecture (previously, the Advanced RISC Machine, and prior to that the Acorn RISC Machine) is a 32-bit RISC processor architecture developed by ARM Holdings PLC, Maidenhead, United Kingdom, that is widely used in a number of embedded designs. Because of their power saving features, ARM CPUs are used in mobile electronic devices where low power consumption is a design goal. As such, ARM CPUs are found in nearly all consumer electronics, from portable devices (PDAs, mobile phones, media players, handheld gaming units, and calculators) to computer peripherals (hard drives, and desktop routers). Such devices typically have limited physical memory in comparison to desktop or laptop computers. In addition, the ARM architecture is an example of a processor architecture that is not virtualizable in that, at least one instruction: (a) has different semantics when executed at user level than when it is executed at kernel level, and (b) it does not trap. As will be described below, and in accordance with one or more embodiments of the present invention, the ARM architecture may be used to support virtualization. For example, in accordance with one or more embodiments of the present invention related to the in-place shadow page table method described herein, any read or write by the guest OS of its own page table may be trapped by executing load or store guest OS instructions as load or store "as user" instructions, and setting page table access bits to deny load or store instructions in user operating mode whose address targets are to these pages. As is known, ARM-based computers have load "as user" and store "as user" instructions that, when executed in the privileged operating mode, automatically check page table access bits, and trap if they are set to deny load or store "as user" instructions.

In accordance with one or more embodiments of the present invention, virtualization software, for example, a VMM, keeps its own top-level translation table (or page directory in non-ARM terminology). The VMM prevents the guest OS from accessing entries in the translation table by preventing access in user mode to pages of the translation table and ensuring that the guest OS accesses the translation table using an "as user" protection scheme described herein (i.e., guest OS load or store instructions will be executed in the "as user" mode, the page table access bits will be set to deny access in the user mode). Initially this VMM translation table is empty of all guest translations. When the guest OS begins execution, page faults will trap to the VMM. The VMM will fill in the appropriate entry in the translation table (page directory), with a corresponding page table. The VMM marks all entries in this corresponding page table as invalid. The faulting guest OS instruction will then be retried. It will fault to the VMM again (because the second-level table entry is marked invalid). The VMM will then translate the faulting entry, and put the validated virtual address-to-machine address mapping into the appropriate second-level page table entry. The instruction will then be retried. Whenever a guest instruction faults to the VMM because of an invalid entry in this second-level table, the VMM uses the physical page number in the original faulting page table entry, translates the entry to a machine page number, and sets the entry to be valid, for example and without limitation, by setting a bit. If there is no physical page number in the entry, then the fault will be delivered to the guest OS.

Figure 6:
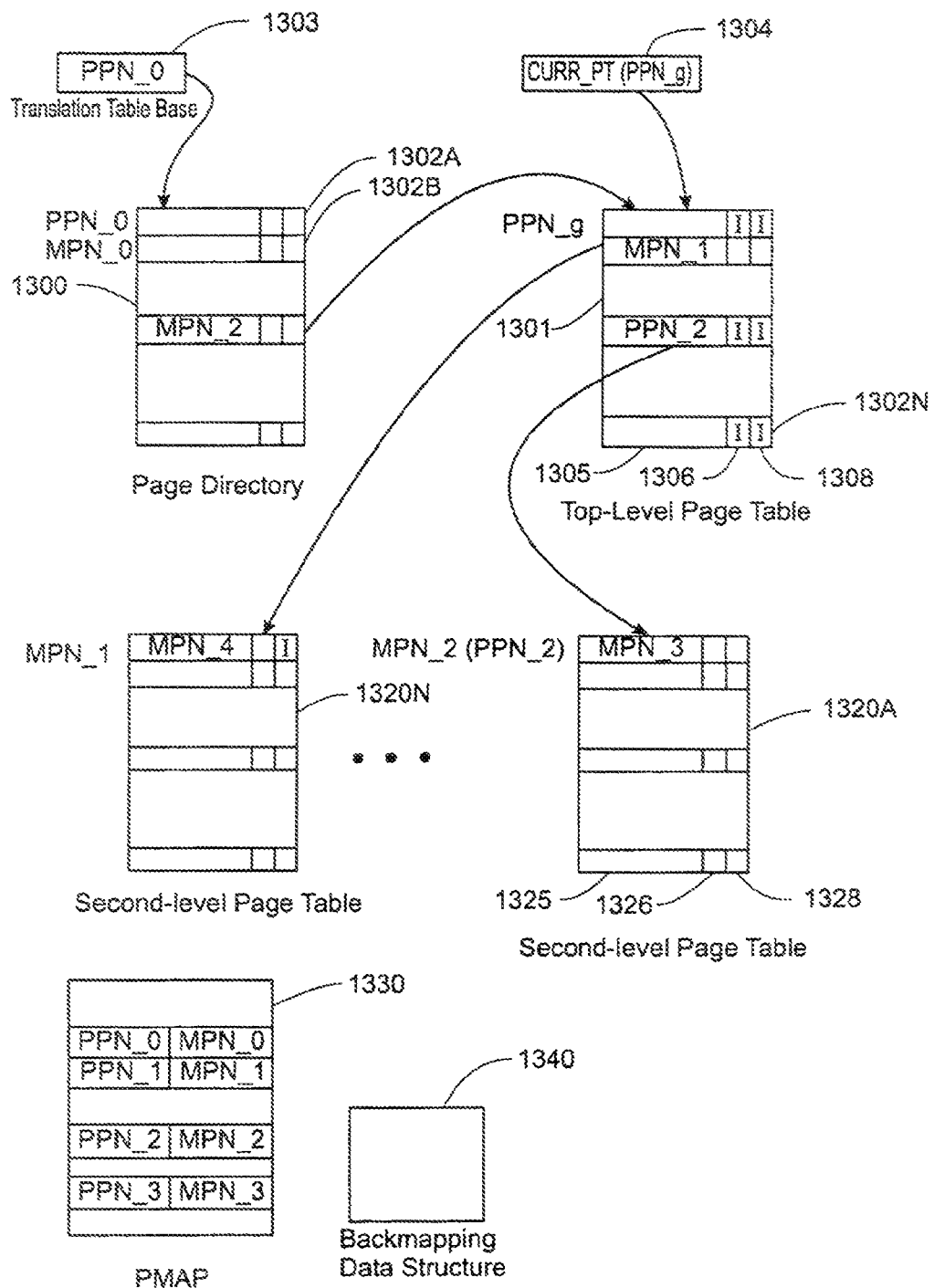
FIG. 6 illustrates diagrammatically an in-place shadow page table in accordance with one or more embodiments of the present invention.
Figure 7A:
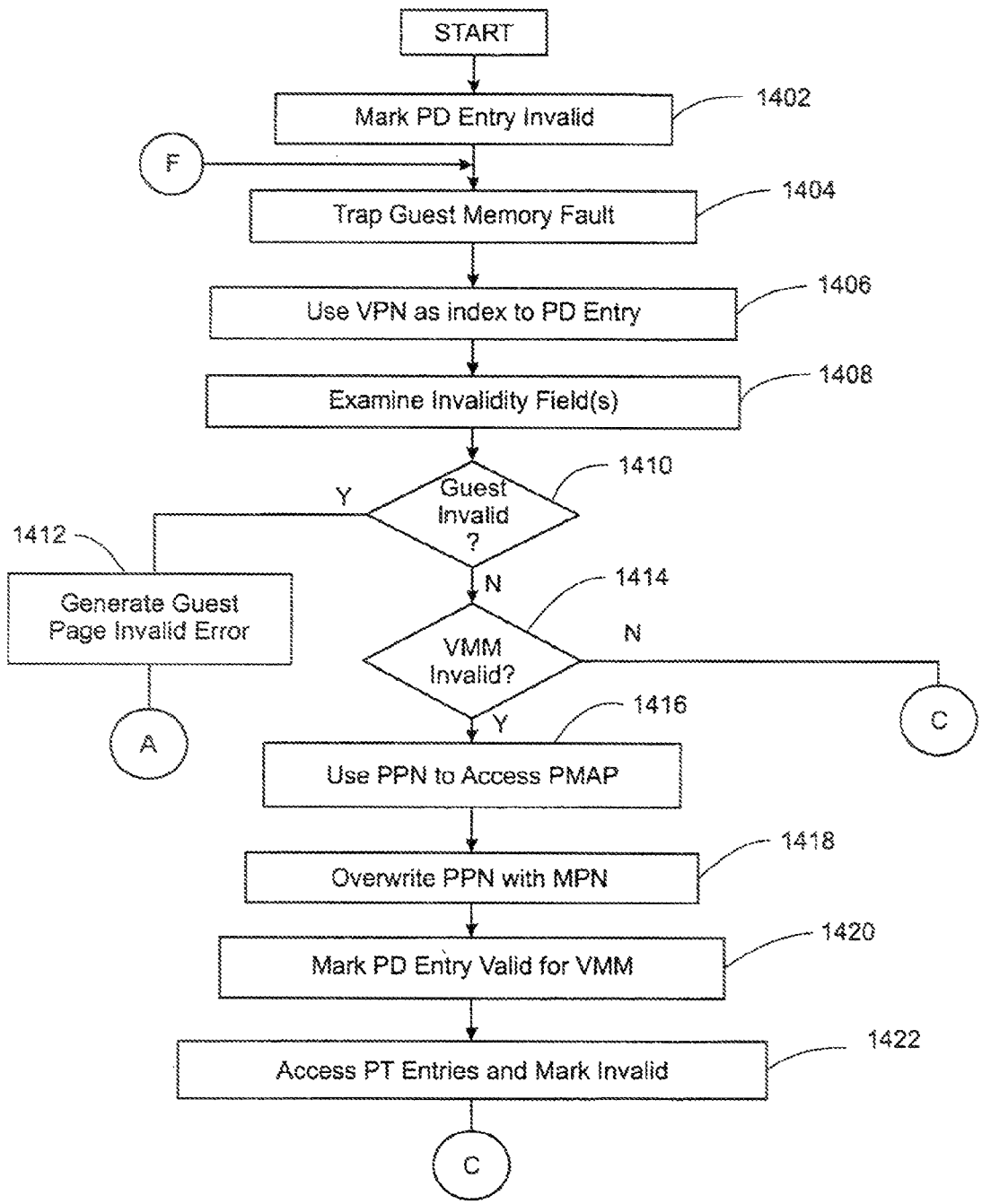
FIGS. 7A-B is a flow chart of a process performed by a virtualization layer, for example, a virtual machine monitor, to implement in-place shadow page tables in accordance with one or more embodiments of the present invention.
Figure 7B:
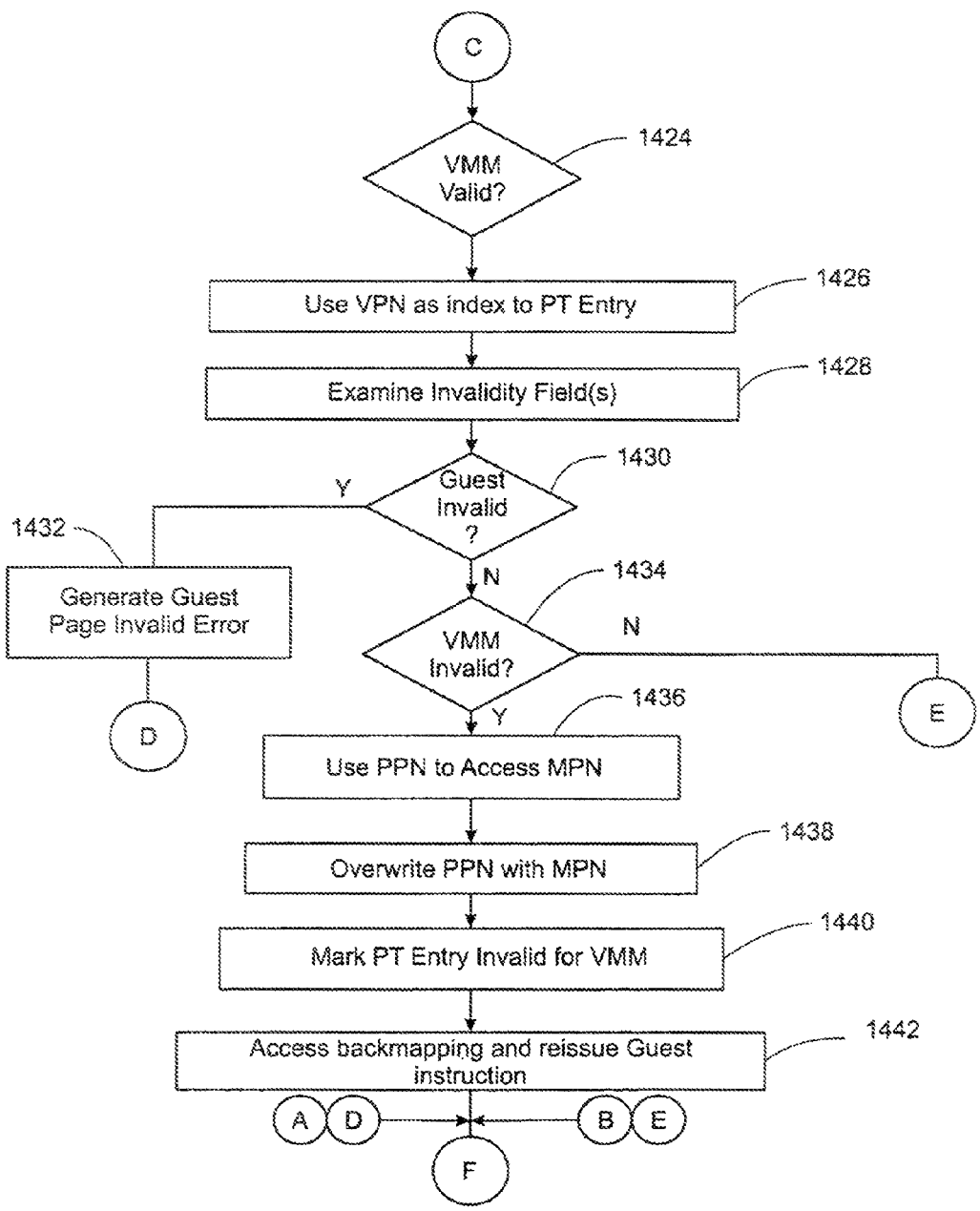

The diagram of FIG. 6 and the flowcharts of FIGS. 7A-B are provided to assist with the understanding of one or more such embodiments of the present invention. Referring to FIG. 6, a multi-level translation table configuration is illustrated that is fabricated in accordance with one or more embodiments of the present invention. As shown in FIG. 6, the VMM maintains a translation table (referred to as a page directory) 1300. This is a shadow page table that is used by the hardware to translate virtual addresses and to check page access permissions. As further shown in FIG. 6, translation table base register 1303 is used by the hardware to find the address of page directory 1300 where, as indicated in FIG. 6, an entry in page directory 1300 points to top-level page table 1301. In addition, a current page table pointer (CURR PT 1304) in the guest OS points to guest current top-level page table 1301. Each entry in top-level page table 1301 comprises: (a) an address reference field (for example, address reference field 1305 of entry 1302N); and (b) at least two variable fields: (i) a guest invalidity bit (for example, guest invalidity bit 1306 of entry 1302N) and (ii) a VMM invalidity bit (VMM invalidity bit 1308 of entry 1302N). These invalidity bits indicate whether the entry in top-level page table 1301 has been previously marked as invalid by the guest OS or the VMM, respectively. As one of ordinary skill in the art can readily appreciate, the two fields may be implemented with a single bit each, or with data in a more complex data format and type. Initially, each of the entries in top-level page table 1301 contains a guest physical page number which points to the start of one of the second-level page tables (second-level page tables 1320A-N).

As illustrated by process block 1402 of FIG. 7A, before the guest OS starts executing, the virtualization software, for example, the VMM, marks each entry in top-level page table 1301 as invalid (for the guest OS and the VMM), for example and without limitation, by setting the appropriate bits. Thus, initially, all guest OS invalidity bits=invalid and all VMM invalidity bits=invalid. Next, as illustrated by process block 1404 of FIG. 7A, as a guest OS executes and attempts to access memory in user mode, a memory fault will be generated by the system hardware. Such a memory fault will be trapped by the VMM, and, as part of memory fault handling, the system hardware will report the faulting guest virtual page number. Next, as illustrated by process block 1406 of FIG.

7A, the VMM examines the guest virtual page number, and uses the same as an index into top-level page table 1301. Next, as illustrated by process block 1408 of FIG. 7A, the VMM examines the guest invalidity bit (for example, guest invalidity bit 1306) and the VMM invalidity bit (for example, VMM invalidity bit 1308) of the entry in top-level page table 1301, and responds according to the values thereof.

As illustrated by decision block 1410 and process block 1412 of FIG. 7A, in a first scenario, if guest invalidity bit 1306=invalid (for example, the bit is set—this indicates that the guest OS had previously marked the entry in top-level page table 1301 as invalid), the VMM will generate and send a page fault notification to the guest OS denoting a "visible page fault." In response, the guest OS will fill in the entry with a PPN in the address reference field in page table 1301 (note, as one of ordinary skill in the art will appreciate, the guest OS never directly updates page tables). Next, the VMM will set guest validity bit 1306=valid for that entry.

As illustrated by decision block 1414 and process block 1416 of FIG. 7A, in a second scenario, if guest invalidity bit 1306=valid (for example, the bit is not set), and VMM invalidity bit 1308=invalid (for example, the bit is set—this indicates that the VMM had previously marked the entry in top-level page table 1301 as invalid), the VMM will use the address reference field (physical page number) stored in the entry as an access key to an entry in a data structure maintained by the VMM—this data structure maintained by the VMM is referred to in FIG. 6 as PMAP 1330 and is also referred to herein as a "shadow page directory". The entry in PMAP 1330 contains a machine page number corresponding to this physical page number key. In accordance with one or more embodiments of the present invention, PMAP 1330 may be implemented as a table with a one-to-one correspondence between physical page numbers and machine page numbers, or, alternatively, it may merely contain a value of an offset, which, when combined with the address reference field (physical page number), provides the value of the machine page number; for example add 1 megabyte to the address reference field (physical page number).

Next, as illustrated by process block 1418 of FIG. 7A, the VMM overwrites the address reference field (physical page number) in the relevant entry of top-level page directory 1301 with the machine page number (MPN) retrieved from PMAP 1330. Next, as illustrated by process block 1420 of FIG. 7A, the VMM will reset VMM invalidity bit 1308=valid for that entry to indicate that the entry in top-level page table 1301 is valid for the VMM, i.e., it provides a mapping from virtual address to machine address the entry is useable as if it were a portion of a shadow page table used by the VMM. Next, as illustrated by process block 1422 of FIG. 7A, the VMM will access one of second-level page tables 1320A-1320N associated with the MPN retrieved from PMAP 1330, and mark all entries within that page table as invalid as to the VMM since the page table is not yet validated and translated into corresponding machine page values. In accordance with one or more embodiments of the present invention, each entry in each of second-level page tables 1320A-N has a pair of variable fields 1326 and 1328, similar to fields 1306 and 1308 of each entry in top-level page table 1301, respectively, for indicating if that particular entry in the second level page table is invalid as to the guest OS or the VMM.

As illustrated by decision block 1414 of FIG. 7A and decision block 1424 and process block 1426 of FIG. 7B, in a third scenario, if guest invalidity bit 1306=valid (for example, the bit is not set), and VMM invalidity bit 1308=valid (for example, the bit is not set—this indicates that the VMM had previously marked the entry in top-level page table 1301 as valid), the VMM uses the virtual page number (VPN) as an index into a page table entry in one of second-level page tables 1320A-1320N. Next, as illustrated by process block 1428 of FIG. 7B, the VMM examines guest invalidity bit 1326 and VMM invalidity bit 1328 of the located page table entry in the second-level page table, and responds according to the values thereof.

Next, as illustrated by decision block 1430 and process block 1432 of FIG. 7B, in a first sub-scenario of scenario three, if guest invalidity bit 1326=invalid (for example, the bit is set—this indicates that the guest OS had previously marked the page table entry in the second-level page table as invalid because the guest OS wanted to protect access to that virtual page), the VMM will generate and send a page fault notification to the guest OS. In response, the guest OS may fill in the entry with a PPN in the address reference field or take whatever other action it deems necessary. If it did fill in the entry, then, the VMM would set guest validity bit 1326=valid for that entry.

Next, as illustrated by decisional block 1434 and process block 1436 of FIG. 7B, in a second sub-scenario of scenario three, if the guest invalidity bit 1326=valid, and VMM invalidity bit 1328=invalid (for example, the bit is set—this indicates that the VMM had previously not validated the second level page table entry after guest validation), the VMM will use the address reference field (physical page number) stored in the page table entry of the second-level page table as an access key to an entry in PMAP 1330 to determine the machine page number. If PMAP 1330 does not contain a machine page number, then the VMM will request a new machine page number from a machine page allocation subsystem, usually provided by the Kernel. PMAP 1330 then updates its data structure to associate the physical page with this new machine page. PMAP 1330 may employ any of a number of well-known associative data structures, such as hash table, a search-tree, contiguous address range mapping, and so forth. Next, as illustrated by process block 1438 of FIG. 7B, the VMM overwrites the address reference field (physical page number) in the page table entry in the second-level page table with the machine page number (MPN) retrieved from PMAP 1330. Next, as illustrated by process block 1440 of FIG. 7B, the VMM will reset the VMM invalidity bit 1328=valid for that entry to indicate that the page table entry in the second-level page table is valid for the VMM, i.e., it provides a mapping from virtual address to machine address the entry is useable as if it were a portion of a shadow page table used by the VMM. Next, as illustrated by process block 1442 of FIG. 7B, the VMM will reissue the guest instruction upon returning from the page fault. In accordance with one or more embodiments of the present invention, any one of a number of methods of maintaining a machine address-to-guest physical address backmapping that are known to those of ordinary skill in the art may be employed. Thereafter, the process may repeat itself for each process physical page number pointed to by current pointer 1304 in an instruction stream. In the above-described manner, the PMAP 1330 data structure will accumulate physical page number to machine page number translations.

The process described above in conjunction with FIGS. 7A-B, may be similarly implemented between other levels of a multi-level page table implementation. For example, in a three-level page table, the process described with reference to process blocks 1402 to 1442 relative to top-level page table 1301 and second-level page tables 1320A-1320N may be similarly performed between one of second-level page tables 1320A-N and a third-level page table referenced thereby (not shown), such implementation being within the understanding of those of ordinary skill in the arts given the disclosure in the specification and figures contained herein.

In accordance with one or more embodiments of the present invention, in addition to PMAP 1330 that translates from physical page numbers to machine page numbers, the virtualization software, for example, the VMM, maintains a machine page address-to-physical page address backmap data structure 1340. The VMM maintains the machine to physical backmap to emulate guest reads and writes to the guest page table. Further, in accordance with one or more further embodiments of the present invention, such a data structure may be implemented with machine pages kept at a coarse granularity. For example, machine pages could be kept at a 1 megabyte size, thereby allowing fewer entries in the backmap structure. Still further, in accordance with one or more still further embodiments, the VMM could match physical pages with machine pages at some alignment to allow the storage of bits that match. Yet still further, in accordance with one or more still further embodiments, a fixed memory offset between physical page addresses and machine page addresses may be utilized. Alternatively, a mixture of several methods could be used, including those mentioned above.

In accordance with one or more embodiments of the present invention that utilize two level page tables, the second-level page table may be made up of many individual page tables. In addition, in accordance with one or more further embodiments of the present invention, hybrid shadow page tables may be used wherein one or more of the second-level page tables utilize a different shadowing technique. Such a hybrid approach takes advantage of performance trade-offs associated with each of the different methods utilized. For example, a traditional shadow page table method uses extra memory while the in-place shadow page table method described herein takes extra CPU overhead when the guest accesses the page tables. A hybrid approach to shadow page table methods may be delineated by sections, so that different sections of a page table may benefit from using different techniques. For example, referring to FIG. 6, a multiple level page table configuration may be understood in which second-level page table 1320A may use a traditional shadow page table method, while any of the other second-level page tables 1320B-N may use the in-place shadow page table method described herein. In accordance with one or more such embodiments of the present invention, policies for determining which sections of a page table level utilize which page table technique can be carried out by the virtualization software, for example, the VMM, based on predefined user rules or parameter thresholds, typically chosen to optimize memory usage and minimize CPU and memory overhead.

Figure 8:
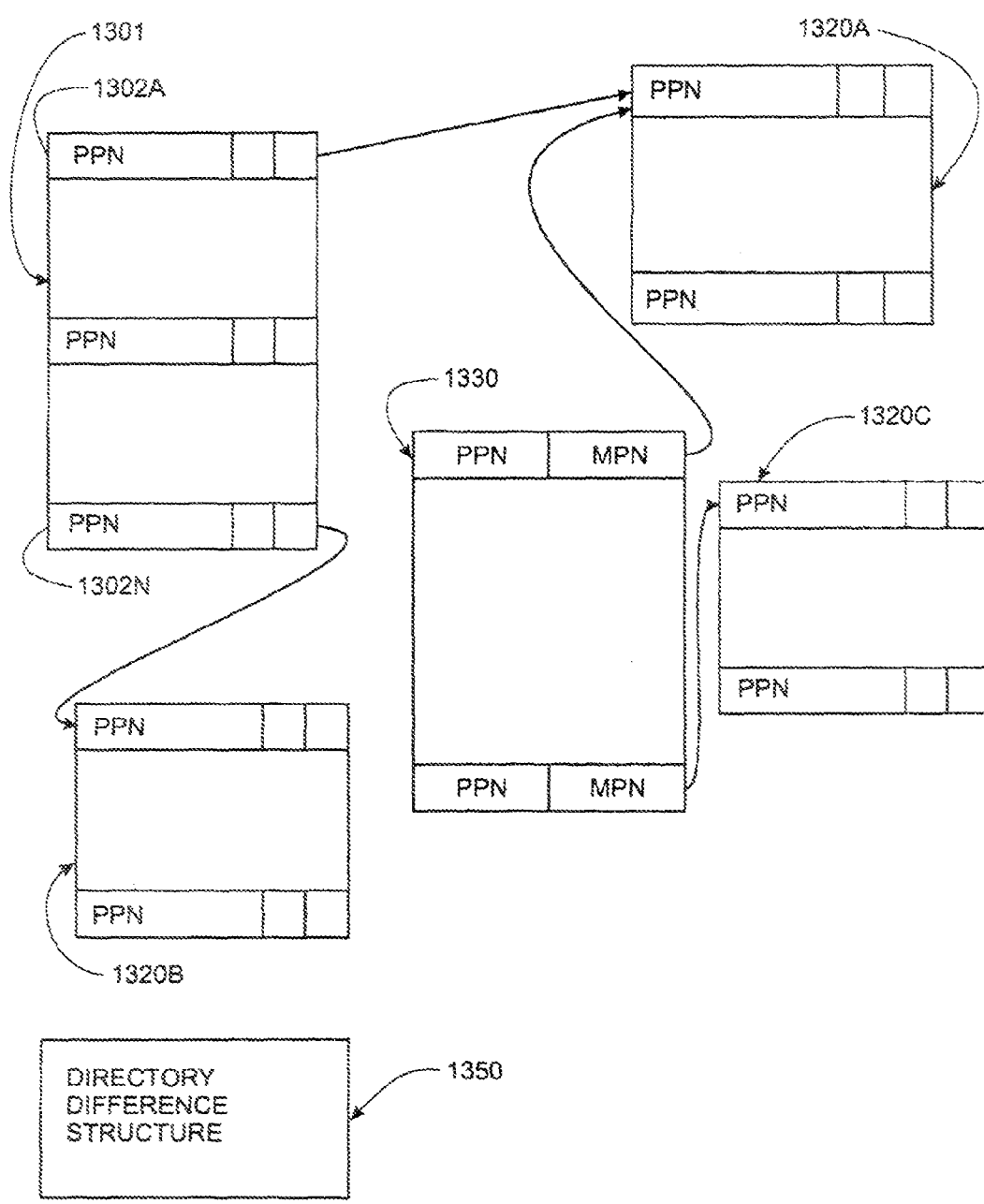
FIG. 8 illustrates diagrammatically a merged guest page directory and shadow page directory in accordance with one or more embodiments of the present invention.

In accordance with one or more embodiments of the present invention, all or a portion of the guest, top-level page table and the shadow page directory (i.e., PMAP 1330 shown in FIG. 6) are merged to reduce memory usage. FIG. 8 illustrates an embodiment wherein guest, top-level page table 1301 includes an entry 1302A that references second-level page table 1320A. As shown in FIG. 8, and as has been described above in conjunction with FIGS. 6 and 7A-7B, the shadow page directory (i.e., PMAP 1330) performs a mapping of physical page address to machine page address. In addition, as indicated in FIG. 8, entry 1302A in top-level page table 1301 and the shadow page directory (i.e., PMAP 1330) both reference the same second-level page table 1320A (such referencing being indicated by arrows in FIG. 8). As such, because both the top-level table and the directory include entries that reference the same second-level page table 1320A, guest top-level page table 1301 and the shadow page directory (i.e., PMAP 1330) are duplicative. In accordance with one or more such embodiments, a portion of guest, top-level page table 1301 and the shadow page directory (i.e., PMAP 1330) are merged to eliminate memory usage for redundant entries. Note that it is sometimes beneficial to maintain two different copies of a second-level translation table. In a case where the guest OS makes frequent references to entries in a particular second-level translation table, many traps can be avoided by allowing the guest OS to directly access this second-level translation table. In that case, the shadow page table will have a separate copy of this second-level translation table whose entries are maintained as described above.

However, merging guest, top-level page table 1301 and shadow page directory 1330 entries is not always possible because corresponding entries (i.e., both entries are accessed using the same PPN) may not reference the same second-level page table. For example, in FIG. 8, entry 1302N in guest, top-level page table 1301 references second-level page table 1320B, whereas the corresponding entry in shadow page directory 1330 references second-level page table 1320C for mapping to the correct machine address. Thus, depending on the contents of entries in guest, top-level page table 1301 and the shadow page directory (i.e., PMAP 1330), some, all or none of the entries may be merged. In accordance with one or more such embodiments, a directory difference structure (i.e., directory difference structure 1350 shown in FIG. 8) identifies which portions, if any, of guest, top-level page table 1301 and shadow page directory 1330 are different. Directory difference structure 1350 indicates when the second-level page table referenced by guest, top-level page table 1301 identifies the machine address (i.e., when the guest, top-level page table and the shadow page directory are merged), and when an entry in guest, top-level page table 1301 must be converted to the correct machine address using the shadow page directory (i.e., when the guest, top-level page table and the shadow page directory are not merged). Directory difference structure 1350 can be a relatively small data structure, thus allowing a reduction in memory usage by eliminating redundant portions of guest, top-level page table 1301 and the shadow page directory.

In accordance with one or more such embodiments, the virtualization software, for example, the VMM, merges and separates guest, top-level page table 1301 and shadow page directory 1330 as the guest OS operates. In response to dynamic changes, the VMM determines, in real-time, that certain portions of guest, top-level page table 1301 and the shadow page directory (i.e., PMAP 1330) may be merged or should be separated. In accordance with one or more such embodiments, the VMM updates directory difference structure 1350 when either merging or separating guest, top-level page directory 1301 and the shadow page directory.

In accordance with one or more further embodiments of the present invention, an adaptive shadow page table method may be used wherein shadow page table methods used are determined by performance trade-offs that vary over time. For example, after a fork in guest instruction processing, the guest OS may be accessing guest page tables frequently, and traditional shadow page table methods may be best. However, sometime thereafter, the in-place shadow page table method described herein may offer the lowest overhead. Policies for determining which shadow page table method will be initially utilized, and when a change is triggered, can be carried out by the virtualization software, for example, the VMM, based on predefined user rules or triggering events, again, such rules or triggering events are typically chosen to optimize memory usage and minimize CPU and memory overhead.

In accordance with one or more further embodiments of the present invention, the virtualization software, for example, the VMM, address space is distributed amongst, guest virtual address space in a manner that ensures granting execute access, but not read or write access, to some of these VMM pages by the guest OS. In accordance with such one or more further embodiments, in-place shadow page tables generated using the above-described methods are protected. Further, in accordance with one or more further such embodiments, the guest OS runs in a privileged mode, however, each guest OS load or store instruction is changed to a load or store "as user" instruction, respectively.

As is well known, an ARM instruction architecture includes an "S" bit (the 'S' bit appears in the instruction encoding), that can be set (to indicate that the instruction should be executed in an "as user" mode). Setting the "S" bit causes security and page faults generated by the instruction to be handled as if the instruction was executed in the user mode. In accordance with one or more such embodiments, all guest load and stores are performed as "as user" instructions so that read or write access to VMM protected pages would fault, and access to non-VMM protected pages are performed like normal loads and stores. This emulates an execute-only protection bit on an architecture that does not provide such a bit because the executing code cannot access itself. In accordance with one or more further embodiments, the method may be extended to allow some virtualization software, for example, VMM, instructions to access VMM code and data but not allow the guest OS to do the same (this change helps avoid ambiguity).

In accordance with one or more further such embodiments, a user/kernel protection bit is used as a guest OS/VMM protection bit. However, the guest OS still wants to use a user/kernel protection bit in the guest page tables. As such, it is desirable to virtualize or emulate the user/kernel protection bit for this purpose. Such an emulation may be implemented by maintaining two shadow page tables—one shadow page table for the kernel mode and one shadow page table for the user mode. In accordance with one or more such embodiments, the user mode shadow page table contains page table entries that are valid only in the emulated user mode, while the kernel mode shadow page table contains page table entries that are only valid in the emulated kernel mode. Then, in accordance with one or more such embodiments, when a virtual processor switches between kernel and user emulating modes, the VMM switches to the corresponding shadow page table.

Figure 9:
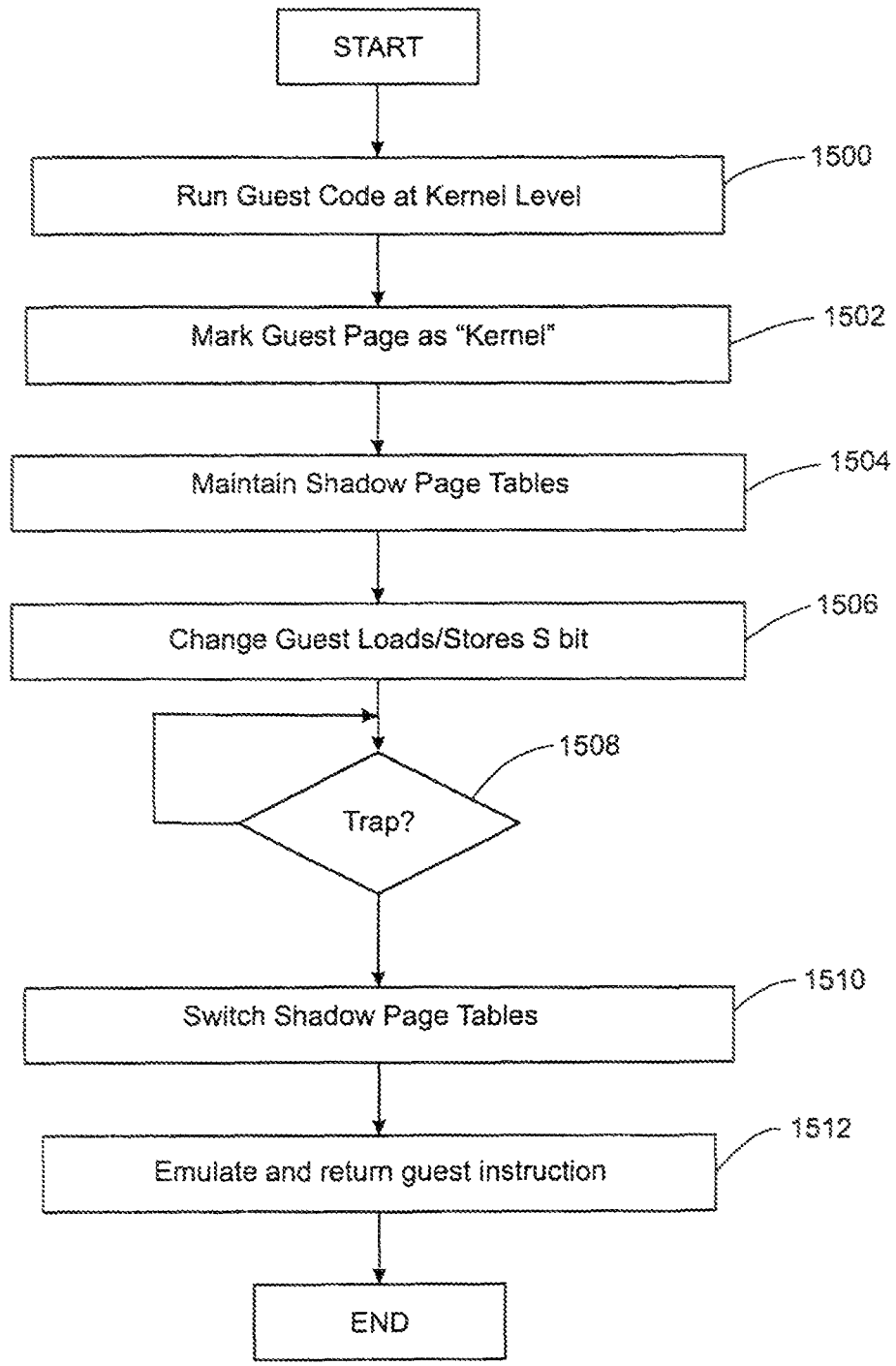
FIG. 9 is a flow chart of a process performed by a virtualization layer, for example, a virtual machine monitor (VMM) to enable VMM virtual address space to be embedded in guest virtual address space in accordance with one or more embodiments of the present invention.

FIG. 9 is a flowchart illustrating one or more embodiments of the above-identified process. As illustrated by process block 1500 of FIG. 9, guest OS kernel code that has not yet been mapped in the page table is to be executed in kernel mode. Next, as illustrated by process block 1502 of FIG. 9, all VMM pages, and any guest pages that the VMM wants to protect for tracing purposes are marked as kernel pages, and the remaining guest pages are marked as user pages in the shadow page table. Next, as illustrated by process block 1504 of FIG. 9, the VMM maintains two shadow page tables, one for the user mode, and one for the kernel mode. Next, as illustrated by process block 1506 of FIG. 9, all VMM loads and stores are treated as normal loads and stores (the VMM is executing in kernel mode), and guest OS kernel load and store instructions are changed to load "as user" and store "as user" instructions, respectively, by manipulating the previously described "S" bit. Next, as illustrated by decisional block 1508 and process block 1510 of FIG. 9, accesses by the guest operating in the kernel mode of its own new guest kernel code are trapped by the VMM, and the VMM switches shadow page tables. Next, as illustrated by process block 1512 of FIG. 9, the VMM emulates and returns the original value expected by the guest. Any of several methods of maintaining such reverse translations may be utilized, including saving a mapping on the side, encoding guest instruction bits inside the translated instruction itself, and so forth. The above process repeats itself, as necessary, depending on the guest instruction stream.

Using the in-place shadow page table technique and the memory protection techniques described herein, it is possible to implement memory and processor virtualization in an architecture, such as the ARM architecture, which has a non-virtualizable instruction set and limited memory resources, including, in accordance with one or more embodiments, without the need for additional memory resources. As a result, the VMM address space is hidden within the guest virtual address space in a distributed and dynamic manner, as illustrated in FIG. 10.

Figure 10:
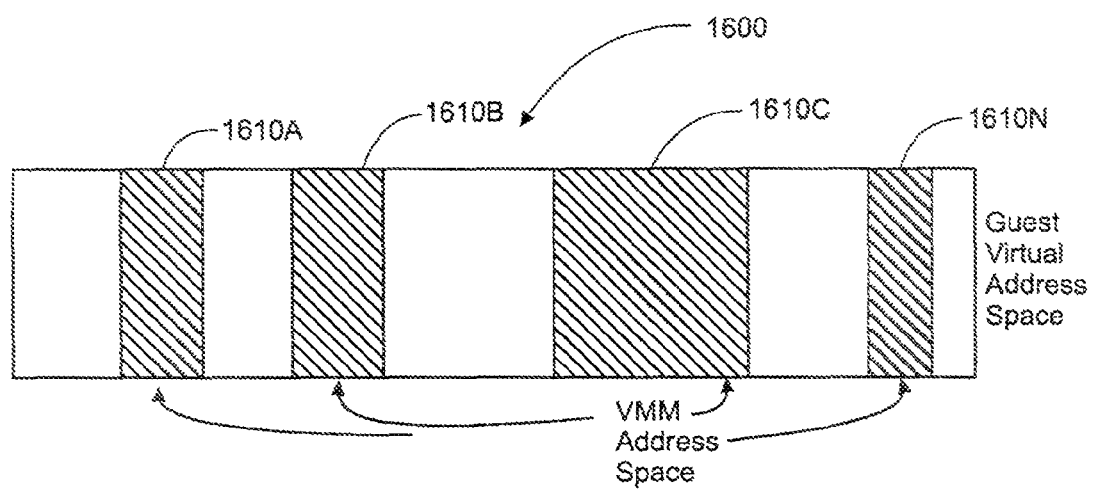
FIG. 10 illustrates a hypothetical distribution of VMM virtual address space within guest virtual address space in accordance with one or more embodiments of the present invention.

As illustrated in FIG. 10, a plurality of segments of VMM memory (which includes memory stolen from the guest for tracing or other purposes) 1610A-N are interspersed among guest virtual address space 1600, such segments are disjointed and transient, being neither contiguous nor segmented but dynamically defined as needed, guided by various needs: (a) to maintain in-place shadow page tables (b) to maintain in-place binary translations of guest instructions during processing of a guest instruction stream; and (c) to minimize VMM/guest address space conflicts.

One or more embodiments of the present invention provide new binary translation methods. In accordance with one or more such embodiments, guest instructions are replaced with translated instructions that are a result of a one-to-one translation, or a trap instruction where the translation comprises, for example and without limitation, a multiple-instruction sequence. In accordance with one or more such embodiments, a trap may be handled in several ways. For example and without limitation, a trap may be used: (a) to interpret a single guest instruction, and to return to translated code; or (b) to jump to a generic or custom-generated trampoline to execute a multiple-instruction sequence. Further, in accordance with one or more such embodiments, the granularity of a translation unit could be, for example and without limitation: (a) a page, referred to herein as a page scanning method; or (b) a basic-block, referred to herein as a fine-grain, in-place translation method, or just an in-place translation method for short.

Figure 11:
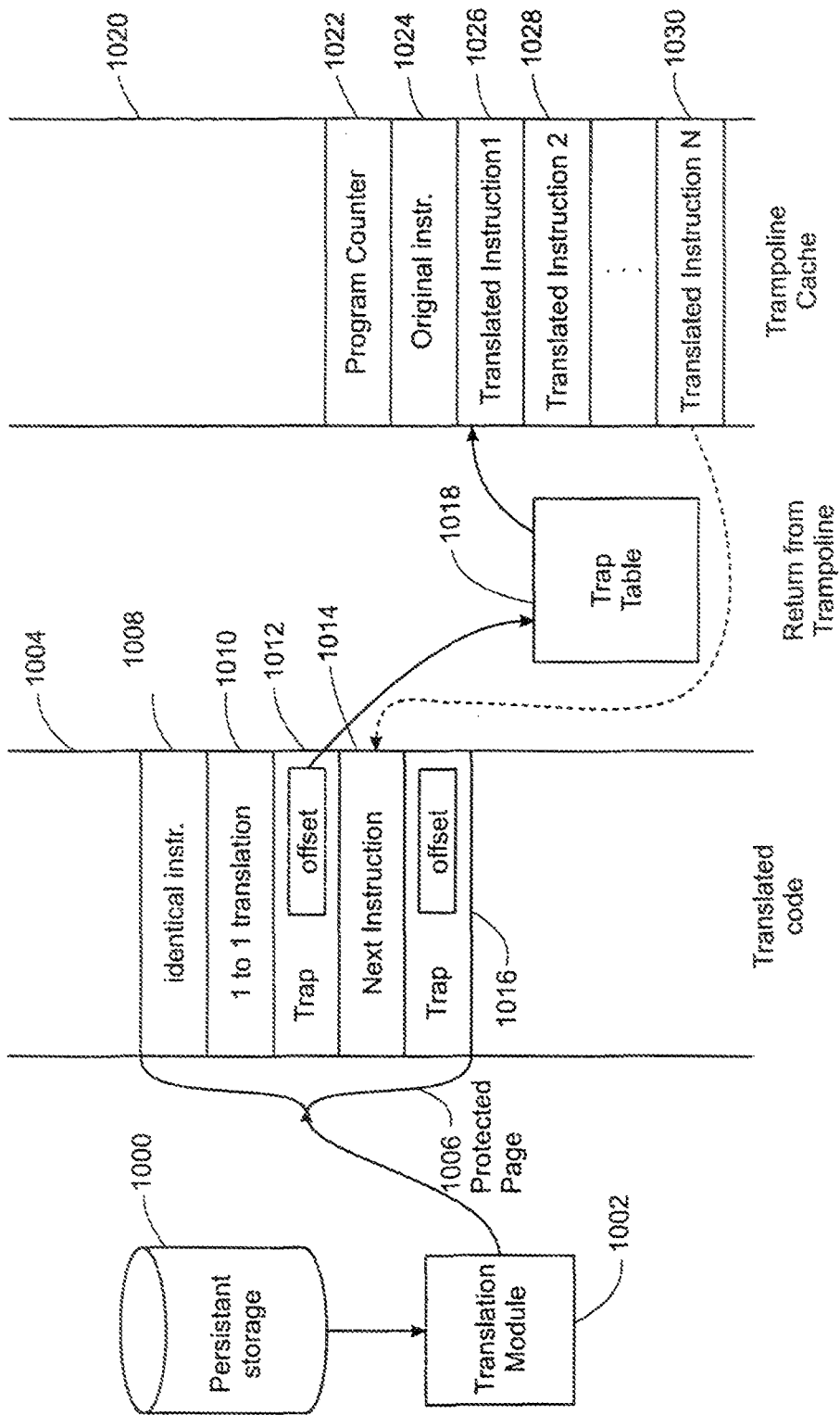
FIG. 11 illustrates diagrammatically a page scanning, in-place binary translation method in accordance with one or more embodiments of the present invention.

FIG. 11 helps illustrate a page scanning, binary translation method in accordance with one or more embodiments of the present invention. The page scanning method starts with the virtualization layer, for example, a VMM, starting with, for example, an empty shadow page table, i.e., with no validated guest page mappings. Upon detecting a fault on the first execution of a guest page, the virtualization layer scans the encountered guest page, translates all the words in the encountered guest page in-place. As shown in FIG. 11, translation module 1002 of the virtualization layer translates code in "protected" (or "non-executable") page 1006 of guest memory 1004 as follows. Instruction 1008 is the identical instruction, i.e., it is not translated. Instruction 1010 is replaced with a 1-to-1 translation (i.e., an in-place translation). Instruction 1012 is a trap with an offset to trap table 1018. As further shown in FIG. 11, trap table 1018 points to trampoline cache 1020 which includes program counter 1022 (PC 1022), the original instruction 1024, and translated instructions 1-N. As further shown in FIG. 11, translated instruction N is a return from the trampoline to next instruction 1014 in the guest page. After translating, the virtualization layer marks the guest page as executable. This in-place binary translation method obviates mapping or reverse mapping for program counter reads and writes because, unlike in a traditional translation cache, the guest addresses and translated addresses are the same except for instructions in a trampoline. When a trap occurs on an instruction in a trampoline, the trap will have the PC in the trampoline. The PC in the trampoline it must be translated to the PC of the instruction that was translated to instruction(s) in the trampoline because the translated guest code is executing from a different location than the original guest instruction. Memory overhead is much less than the overhead associated with a translation cache because, with in-place translation, most of the instructions are not in the translation cache. Also, interrupt and exception delivery can be implemented in this method without having to re-map the program counter.

The above-described page scanning, binary translation method could lead to emulation for data since code and data may coexist in a single page. As such, translating every word in a page blindly may be undesirable. In addition, sometimes, policing control-flow may be necessary, even after page scanning, for example, to ensure that the target of a branch has been translated in the correct processor mode, for example and without limitation, ARM vs. Thumb mode. To address these issues, one or more embodiments of such a binary translation method may entail translating instructions only as, and when, they are encountered through execution control-flow (i.e., only instructions that are executed are translated), and control-flow actions would be policed.

As one of ordinary skill in the art will appreciate, although the above-described binary translation method entails translating all program counter (PC) write instructions, there is no need to translate PC read instructions since the guest and translated PC values are the same. In further addition, while policing PC write instructions, the virtualization software, for example, the VMM, only needs to verify that a target address has been translated in the expected processor mode. This means that the virtualization software, for example, the VMM, does not have to perform a mapping from guest to translated addresses, nor does the VMM have to maintain a reverse mapping from translated addresses to guest addresses.

For above-described binary translation method, for most instructions, an identity translation occurs, i.e., the guest instruction is not modified. However, for instructions that do get modified to deal with CPU virtualization, several methods of maintaining a translated-to-guest instruction reverse translation may be used. For example, and without limitation: (a) maintaining a mapping for translated instruction addresses to original guest instruction bits; and (b) memory space is saved by encoding a predetermined number of bits (and storing them as unused bits of a trap instruction) to regenerate guest instructions. In this way, the original guest instruction can be regenerated when there is a guest memory access to that address.

Because page scanning could lead to emulation of memory accesses for data because of code and data co-existing in a page, translating upon execution may be better in such cases. Because there is CPU emulation overhead associated with in-place translation methods, it may not always be the best choice. For instance, for a code page that is being read or written often by the guest, instruction emulation overhead can be high. Also, if a page has too many instructions that need emulation or trampolines, traditional cached translation may be better. To address these issues, in accordance with one or more embodiments of the present invention, a hybrid CPU virtualization scheme includes combining in-place translation and page scanning methods with a traditional, cached binary translation method, and even with, direct execution, and interpretation.

Thus, in accordance with one or more such embodiments of the present invention, CPU virtualization for a guest comprises a combination of one or more of the following: (a) interpretation; (b) traditional cached binary translation, (c) page scanning, binary translation, (d) in-place binary translation; and (e) direct execution. As may be appreciated by one of ordinary skill in the art, each of these methods has conditions under which it may be more suitable than others. For example, direct execution is suitable only when guest user-mode code is being run. Page scanning is suitable if the guest software does not have too much mixing of code and data in the same pages (if not, too many instructions will lead to trap emulation), and if processor modes are not being switched too often. In addition, trade-offs among the various CPU virtualization methods may vary over time, for example, as the number of guest VMs change over time. In accordance with another aspect of the techniques disclosed herein, these CPU virtualization methods may be changed over time. Thus, a method of changing the various CPU virtualization methods used over time is referred to herein as adaptive CPU virtualization. In accordance with one or more embodiments of the present invention, an adaptive CPU virtualization method may combine any of the five methods mentioned above to virtualize a CPU for a guest, each method being activated for guest code of appropriate characteristics.

Although various exemplary embodiments of the subject disclosure have been disclosed, it will be apparent to those skilled in the art that various changes and modifications can be made which will achieve some of the advantages of the subject disclosure without departing from the spirit and scope of the subject disclosure. It will be clear to those reasonably skilled in the art that other components performing the same functions may be suitably substituted. Further, the methods of the subject disclosure may be achieved in either all software implementations, using the appropriate processor instructions, or in hybrid implementations which utilize a combination of hardware logic and software logic to achieve the same results.

Although the embodiments disclosed herein are described with reference to specific implementations, many other variations are possible. For example, the techniques and systems described herein may be used in both a hosted and a non-hosted virtualized computer system, regardless of the degree of virtualization, and in which the virtual machine(s) have any number of physical and/or logical virtualized processors. In addition, such functionality may also be implemented directly in a computer's primary operating system, both where the operating system is designed to support virtual machines and where it is not. Moreover, the concepts may even be implemented wholly or partially in hardware, for example in processor architectures intended to provide hardware support for virtual machines. Also, numerous programming techniques utilizing various data structures and memory configurations may be utilized to achieve the results described herein. For example, the tables, record structures and objects may all be implemented in different configurations, redundant, distributed, etc., while still achieving the same results.

Also, one or more embodiments of the present invention may also be implemented in other computer systems that involve less than full virtualization. Thus, one or more embodiments of the present invention may be implemented in systems in which direct access is provided to some physical resources, instead of virtualizing all physical resources. In addition, one or more embodiments of the present invention may be implemented in computer systems involving so-called paravirtualization. In paravirtualized computer systems, the virtualized hardware platform is not identical to an actual physical platform, so software that is designed to run on the actual physical platform should be modified or ported to run on the virtualized hardware platform. One or more embodiments of the present invention may be implemented in a wide variety of virtual computer systems, ranging from systems in which only selected physical resources are virtualized to systems in which a complete, actual hardware platform is virtualized.

In addition to any of the foregoing implementations, subject matter described herein may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette, CD-ROM, or disks, or transmittable to a computer system in a carrier wave, via a modem or other interface device, such as a communications adapter connected to the network over a medium. Such transmittable computer instructions may be transmittable over communication media such as, but not limited to, optical or analog communications lines, or may be transmittable using wireless transmission techniques such as, but not limited to, microwave, infrared or other transmission techniques. The series of computer instructions, whether contained in a tangible medium or not, embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

What is claimed is:

1. A method for operating in a computing system comprised of virtualization software including a guest operating system (OS), the method comprising:
   maintaining, by the virtualization software layer, a first shadow page table for use in a kernel mode;
   maintaining, by the virtualization software layer, a second shadow page table for use in a user mode; and
   switching, by the virtualization software, between using the first shadow page table and the second shadow page table when the guest OS switches between operating in the kernel mode and the user mode.

2. The method of claim 1 further comprising:
   receiving a kernel mode guest OS instruction; and
   using the first shadow page table to process the kernel mode guest OS instruction.

3. The method of claim 1 further comprising:
   receiving a user mode guest OS instruction; and
   using the second shadow page table to process the user mode guest OS instruction.

4. The method of claim 1 wherein the first shadow page table maintains entries only valid in the kernel mode and the second shadow page table maintains entries only valid in the user mode.

5. The method of 1 further comprising:
   marking guest OS pages having all user mode guest OS instructions as user mode pages;
   marking guest OS pages having kernel mode guest OS instructions as kernel mode pages; and
   marking all pages in virtualization software address space as kernel mode pages, wherein the first shadow page table is maintained for the kernel mode pages and the second shadow page table is maintained for the user mode pages.

6. The method of 1 further comprising:
   changing kernel mode guest OS load or store instructions to load "as user" or store "as user" instructions;
   trapping accesses by the guest OS of kernel mode guest OS instructions;
   switching from the first shadow page table to the second shadow page table; and
   emulating and returning a value expected by the guest OS using the second shadow page table.

7. The method of 6 wherein changing comprises:
   setting an "S" bit in each of the load or store instructions to indicate that the load or store instruction should be executed in the user mode.

8. The method of claim 1 further comprising:
   treating a virtualization software layer load or store instruction as a normal load or store, respectively; and
   returning a value using the first shadow page table for the virtualization software layer load or store instruction.

9. A non-transitory computer-readable storage medium containing instructions for operating in a computing system comprised of virtualization software including a guest operating system (OS), the instructions, when executed, control the computer system to be configured for:
   maintaining, by the virtualization software layer, a first shadow page table for use in a kernel mode;
   maintaining, by the virtualization software layer, a second shadow page table for use in a user mode; and
   switching, by the virtualization software, between using the first shadow page table and the second shadow page table when the guest OS switches between operating in the kernel mode and the user mode.

10. The non-transitory computer-readable storage medium of claim 9 further comprising:
    receiving a kernel mode guest OS instruction; and
    using the first shadow page table to process the kernel mode guest OS instruction.

11. The non-transitory computer-readable storage medium of 9 further comprising:
    receiving a user mode guest OS instruction; and
    using the second shadow page table to process the user mode guest OS instruction.

12. The non-transitory computer-readable storage medium of 9 wherein the first shadow page table maintains entries only valid in the kernel mode and the second shadow page table maintains entries only valid in the user mode.

13. The non-transitory computer-readable storage medium of 9 further comprising:
    marking guest OS pages having all user mode guest OS instructions as user mode pages;
    marking guest OS pages having kernel mode guest OS instructions as kernel mode pages; and
    marking all pages in virtualization software address space as kernel mode pages, wherein the first shadow page table is maintained for the kernel mode pages and the second shadow page table is maintained for the user mode pages.

14. The non-transitory computer-readable storage medium of 9 further comprising:
    changing kernel mode guest OS load or store instructions to load "as user" or store "as user" instructions;
    trapping accesses by the guest OS of kernel mode guest OS instructions;
    switching from the first shadow page table to the second shadow page table; and
    emulating and returning a value expected by the guest OS using the second shadow page table.

15. The non-transitory computer-readable storage medium of 14 wherein changing comprises:
    setting an "S" bit in each of the load or store instructions to indicate that the load or store instruction should be executed in the user mode.

16. The non-transitory computer-readable storage medium of claim 9 further comprising:
    treating a virtualization software layer load or store instruction as a normal load or store, respectively; and
    returning a value using the first shadow page table for the virtualization software layer load or store instruction.

17. An apparatus comprised of virtualization software including a guest operating system (OS), the apparatus comprising:
    one or more computer processors; and
    a non-transitory computer-readable storage medium comprising instructions, that when executed, control the one or more computer processors to be configured for:
    maintaining, by the virtualization software layer, a first shadow page table for use in a kernel mode;
    maintaining, by the virtualization software layer, a second shadow page table for use in a user mode; and
    switching, by the virtualization software, between using the first shadow page table and the second shadow page table when the guest OS switches between operating in the kernel mode and the user mode.

18. The apparatus of claim 17 further configured for:
    receiving a kernel mode guest OS instruction; and
    using the first shadow page table to process the kernel mode guest OS instruction.

19. The apparatus of claim 17 further comprising:
    receiving a user mode guest OS instruction; and
    using the second shadow page table to process the user mode guest OS instruction.

20. The apparatus of claim 17 wherein the first shadow page table maintains entries only valid in the kernel mode and the second shadow page table maintains entries only valid in the user mode.

* * * * *